(12) United States Patent
Rao

(10) Patent No.: US 9,749,886 B1
(45) Date of Patent: Aug. 29, 2017

(54) SYSTEM FOR DETERMINING METRICS OF VOICE COMMUNICATIONS

(71) Applicant: AMAZON TECHNOLOGIES, INC., Seattle, WA (US)

(72) Inventor: Siddhartha Shankara Rao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 239 days.

(21) Appl. No.: 14/623,411

(22) Filed: Feb. 16, 2015

(51) Int. Cl.
*H04L 12/26* (2006.01)
*H04L 12/28* (2006.01)
*H04L 12/16* (2006.01)
*H04W 24/08* (2009.01)

(52) U.S. Cl.
CPC .................................. *H04W 24/08* (2013.01)

(58) Field of Classification Search
CPC ..... H04L 47/10; H04L 43/50; H04L 12/2697; H04L 43/0852; H04L 43/00
See application file for complete search history.

(56) References Cited

U.S. PATENT DOCUMENTS

| | | | | |
|---|---|---|---|---|
| 7,133,923 B2 * | 11/2006 | MeLampy | ........ | H04L 29/06027 709/231 |
| 7,535,905 B2 * | 5/2009 | Narayanan | ............ | H04L 63/126 370/392 |
| 8,005,071 B2 * | 8/2011 | Kim | .................. | H04L 29/06027 370/352 |
| 8,320,384 B2 * | 11/2012 | Oouchi | .................... | H04L 12/66 370/395.31 |
| 8,346,774 B1 * | 1/2013 | Kanevsky | ......... | G06F 17/30501 707/600 |
| 8,695,077 B1 * | 4/2014 | Gerhard | .............. | H04L 63/0815 726/8 |
| 9,094,257 B2 * | 7/2015 | Morrill | ............. | H04L 29/06027 |
| 2003/0112758 A1 * | 6/2003 | Pang | .................... | G06F 15/7842 370/235 |
| 2008/0033303 A1 * | 2/2008 | Wariar | ............... | A61B 5/02028 600/483 |
| 2008/0049626 A1 * | 2/2008 | Bugenhagen | ........... | H04L 41/08 370/241 |
| 2008/0049637 A1 * | 2/2008 | Morrill | ................... | H04L 65/80 370/252 |
| 2008/0049638 A1 * | 2/2008 | Ray | ..................... | H04L 41/0896 370/252 |

(Continued)

*Primary Examiner* — Mark Rinehart
*Assistant Examiner* — Sanjay K Dewan
(74) *Attorney, Agent, or Firm* — Lindauer Law, PLLC

(57) ABSTRACT

Described are techniques for determining metric data associated with a network by providing interrogatory data to the network in-line, using an existing connection. The interrogatory data may request metric data regarding one or more devices. Response data may be received responsive to the interrogatory data and may include at least a portion of the requested metric data and destination network element data indicative of one or more devices within the network. The metric data may be stored in association with the destination network element data and the communication type corresponding to the communication conducted over the existing connection. Stored metric data from previous communications may be used to determine a quality metric to facilitate selection of a network for the initiation of a subsequent communication.

20 Claims, 8 Drawing Sheets

(56) References Cited

U.S. PATENT DOCUMENTS

| | | | | |
|---|---|---|---|---|
| 2008/0052387 A1* | 2/2008 | Heinz | ................ | H04L 41/5025 709/223 |
| 2009/0161566 A1* | 6/2009 | Sridhar | ............... | H04L 12/2856 370/252 |
| 2012/0127882 A1* | 5/2012 | Edwards | ............... | H04M 15/00 370/252 |
| 2013/0155889 A1* | 6/2013 | Brownworth | ..... | H04W 36/0083 370/252 |
| 2013/0159502 A1* | 6/2013 | Thompson | .......... | H04L 63/0815 709/224 |
| 2014/0105139 A1* | 4/2014 | Tomici | ................ | H04W 76/025 370/329 |
| 2015/0036483 A1* | 2/2015 | Hassan | ................... | H04L 45/50 370/223 |
| 2015/0106501 A1* | 4/2015 | Malets | ................ | H04L 41/5019 709/224 |
| 2016/0056927 A1* | 2/2016 | Liu | ....................... | H04W 28/04 370/216 |

\* cited by examiner

SYSTEM FOR DETERMINING METRICS OF VOICE COMMUNICATIONS

BACKGROUND

Voice over Internet Protocol (VoIP) and other types of communications may be routed through various network elements, each of which may affect the overall quality of the communication.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
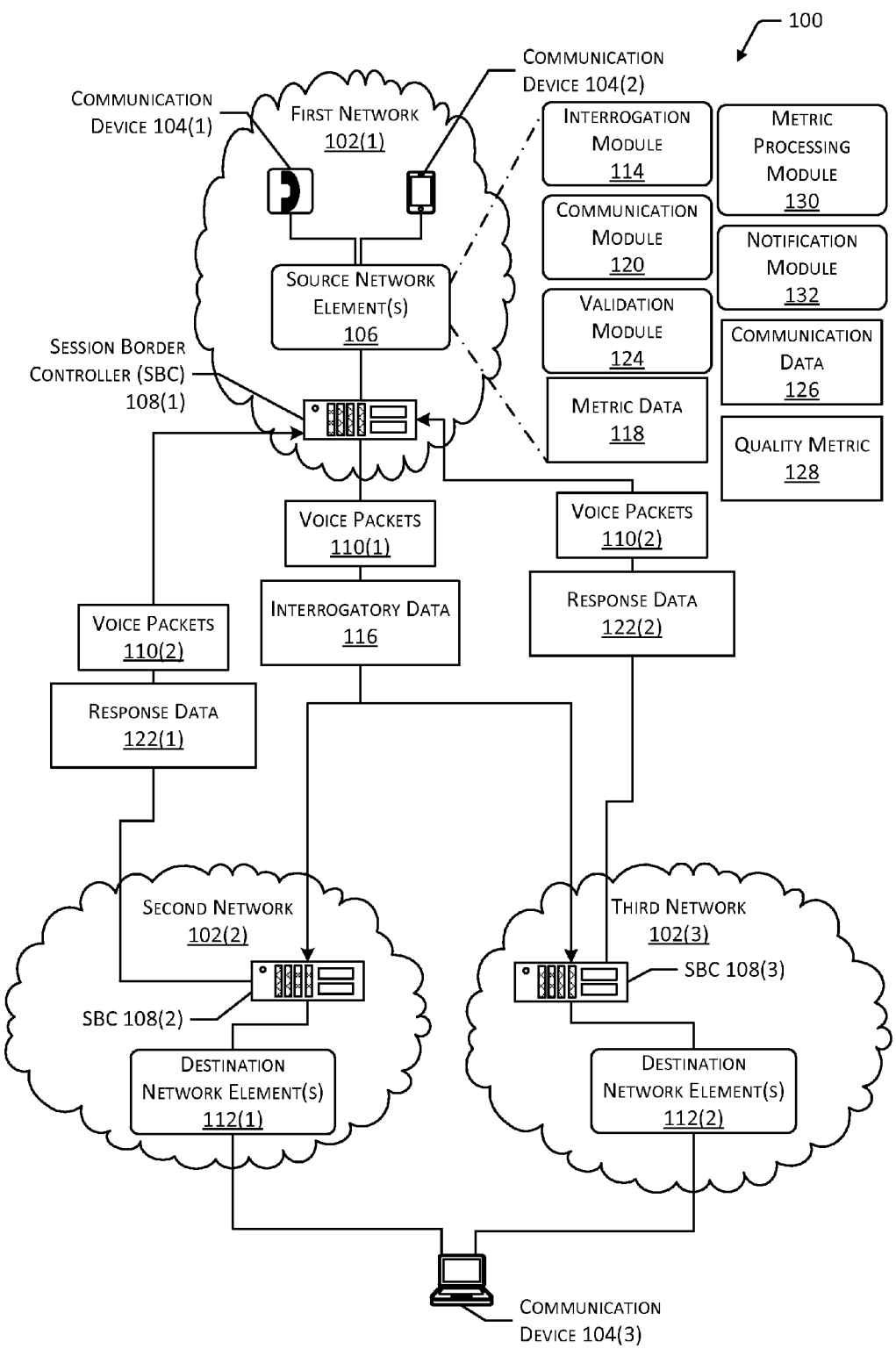
FIG. 1 depicts a system for determining metric data associated with communications provided to a destination using one or more networks.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

Voice communications, such as Voice over Internet Protocol (VoIP) and Voice over Long Term Evolution (VoLTE) communications, as well as video communications, may include multiple data packets, such as network or IP packets that include audio data or video data, and may be provided using one or more of a session initiation protocol (SIP) connection or a Real-time Transport Protocol (RTP) connection. A communication may be initiated by a party associated with a first network or device (e.g., a source network element) and may be routed to a destination across one or more additional network elements. Network elements may include any manner of hardware or software-based equipment or facilities that may be used to enable communication devices associated with a first network to communicate with other communication devices or networks. For example, network elements may include modems, routers, access points, servers, computing devices, telecommunication devices, telephone exchanges (e.g., a private branch exchange (PBX)), computer clusters, and so forth. A party initiating a communication may initiate one or more of a SIP or RTP connection with a third-party network, such as a network associated with an internet service provider. The SIP or RTP connection may be initiated by accessing a session border controller (SBC) or similar device associated with the third-party network. The SBC, or another type of third-party device, may route the communication through one or multiple network elements to reach the endpoint of the connection. The endpoint may include a communication device associated with the recipient of the communication. In other implementations, the endpoint may include a device associated with an egress point at which the communication ceases to be transmitted as data packets over the SIP or RTP connection, such as a SBC that transcodes, and provides the communication to a local telephone system. For example, data packets that reach an endpoint of a SIP connection may be converted to audio or video data provided to the local telephone system via physical cables.

The quality of a communication may be determined by the latency, jitter, packet loss, or other types of metric data associated with the endpoint of the connection and each intermediate network element through which the communication is routed to reach the endpoint. Network elements associated with a third-party network, and the metric data associated with the additional network elements, may not be visible to the party initiating the communication due to the party being external to the third-party network.

This disclosure relates to techniques for determining metric data associated with network elements. The network elements may include destination network elements, which may include an egress device associated with the endpoint of a connection, as well as one or more intermediate network elements through which data packets may be routed. An existing SIP or RTP connection between a source network element and an initial destination network element, such as a SBC, may be accessed. For example, a VoIP communication may currently be occurring over one or more of a SIP connection or a RTP connection that was previously generated to conduct the VoIP communication. Data packets, such as voice packets, may be provided from the initial source network element to the endpoint of the communication via the SIP or RTP connection by routing the data packets through a series of intermediate network elements. Each data packet may include one or more packet characteristics, such as a selected length of ten, twenty, or thirty milliseconds (ms). Packet characteristics may also include a selected data structure, one or more identifiers, and so forth.

To determine metric data associated with one or more of the destination network elements, an interrogatory packet may be provided in-line to the initial destination network element using the SIP or RTP connection. In some implementations, the interrogatory packet may have a length, a data structure, or other characteristics similar or identical to characteristics of the voice packets. The interrogatory packet may therefore be transmitted between network elements to the endpoint of the communication in the same manner as the voice packets. For example, an interrogatory packet may be provided between voice packets at a selected frequency, such as one interrogatory packet per minute. A network element that is not configured to process an interrogatory packet may fail to differentiate the interrogatory packet from the voice packets and may transmit the interrogatory packet to a subsequent network element in the manner that a voice packet would be transmitted. A network element configured to process the interrogatory packet may consume or otherwise remove the interrogatory packet from the data stream provided through the SIP or RTP connection. Removing of the interrogatory packet from the data stream may prevent the interrogatory packet from reaching a communication device associated with the VoIP communication, which may be unable to process the interrogatory packet.

The interrogatory packet may include a cryptographic signature, an electronic certificate, or other types of credentials, digital signatures, or identifiers associated with the party initiating the communication. The interrogatory packet may also include source network element data indicative of the network element(s) associated with providing the interrogatory packet to the initial destination network element. The interrogatory packet may further include a request for metric data associated with one or more destination network elements. For example, the interrogatory packet may request one or more of latency data, jitter data, or packet loss data associated with an endpoint device, one or more intermediate network elements, or a combination thereof.

One or more network elements that process the interrogatory packet may provide a response packet for receipt by one or more source network elements. The response packet may have a format or structure similar to that of the interrogatory packet. For example, a response packet may include a signature or other credentials or identifiers indicative of the third-party network, destination network element data indicative of one or more of the network elements associated with the connection, and at least a portion of the metric data requested by the interrogatory packet. In some implementations, correspondence between one or more of the received signature or the destination network element data and communication data associated with known network element data or signatures may be used to determine the accuracy and validity of the response packet. For example, a response packet indicating network elements not found in call detail records (CDR) associated with a third-party network may indicate a false or erroneous response packet.

The metric data received in the response packet may be stored in a data store, in association with one or more of the third-party network, destination network elements through which the communication was routed, or a communication type associated with the routed communication. For example, one type of communication may include a VoIP communication that egressed to a public telephone network in a certain region of the world. As another example, a type of communication may include a VoLTE communication between devices associated with different cellular networks. The metric data may be used to determine quality metrics associated with the networks or network elements. Quality metrics may be used to determine networks that may provide communications having greater quality (e.g., lower latency, jitter, or packet loss) compared to other networks when initiating a subsequent communication. Quality metrics may also be used to identify current deviations in the performance of one or more network elements, which may be used to generate notifications, correct deficiencies, enforce service level agreements (SLAs), and so forth. For example, a user may intend to initiate a VoIP communication using a SIP connection. Based on metric data previously received from one or more networks during communications of that type, a determination may be made regarding an initial destination network element with which to initiate the SIP connection. Continuing the example, the SIP connection may be established with an initial destination network element likely to route the communication in a manner having latency, jitter, and packet loss values unlikely to negatively impact the quality of the communication.

In some implementations, variances between received metric data and existing communication data, which may include previously-received metric data, may be used to generate notifications regarding the metric data. Notifications may be provided to administrators or other parties responsible for maintaining one or more of the destination network elements to facilitate correction of deficiencies, to enforce SLAs, and so forth. In other implementations, the frequency at which interrogatory packets are provided to an initial destination network element may be increased or decreased based on the received metric data. For example, a receipt of metric data indicating a latency, jitter, or packet loss value that may negatively impact the quality of a communication may result in an increase in the frequency in which subsequent interrogatory packets are provided. A receipt of metric data indicating quality in excess of a threshold value may result in no change or a decrease in the frequency in which interrogatory packets are provided.

Implementations described in this disclosure may therefore enable a party to determine an initial destination network element with which to establish a connection based on the quality (e.g., low latency, jitter, or packet loss) associated with that network element. Implementations described herein may further enable metric data associated with a particular network element, type of communication, region, and so forth, to be determined by providing interrogatory data in-line, using an existing SIP or RTP connection. The metric data may also be used to determine an initial destination network element with which to establish a subsequent connection based on the particular network elements through which a communication may be routed, the type of communication to be initiated, or the region. Implementations described herein may also be used to determine a condition or status of one or more network elements based on metric data and may be used to generate notifications regarding the metric data. For example, implementations described herein may be used to identify potential hindrances to communication quality or to troubleshoot an existing communication, a network, or one or more devices within the network.

FIG. 1 depicts a system 100 for determining metric data associated with communications provided to a destination using one or more networks 102. A first network 102(1) may include one or more communication devices 104 configured to provide data, packets corresponding to a VoIP or VoLTE communication, to other communication devices 104 associated with other networks 102. A communication device 104 may include any manner of computing device or telecommunication device, such as a telephone, mobile device, smartphone, set-top box, tablet computer, personal computer, wearable computer, and so forth. For example, a first communication device 104(1) associated with the first network 102(1) may include a VoIP phone, while a second communication device 104(2) associated with the first network 102(1) may include a smartphone. In some implementations, one or more communication devices 104 may include computing devices configured to execute browser-based interfaces. For example, the communication devices 104 may use Web Real-Time Communication (WebRTC) to support voice calling, video chat, file sharing, and so forth between devices, and may control calls using a hypertext transfer protocol (HTTP)—based Representational State Transfer (REST) interface. WebRTC may be compatible with at least a portion of the WebRTC 1.0 specification, or later version, as promulgated by the World Wide Web Consortium at www.w3.org.

The first network 102(1) may also include one or more source network elements 106 in communication with the first communication device 104(1) and the second communication device 104(2). For example, the first communication device 104(1) may be in wired communication with a modem, which may in turn communicate with a PBX. The PBX may provide communications to the public switched telephone network (PSTN). The second communication device 104(2) may be in wireless communication with a router via a local area network (LAN) or wide area network (WAN), which may in turn communicate with the PBX and PSTN. A first session border controller 108(1) (SBC) may serve as a point of demarcation between the first network 102(1) and other networks 102. The first SBC 108(1) may be in communication with one or more of the source network elements 106 or communication devices 104 of the first network 102(1). The SBC 108(1) may include any type of computing device, such as a server, a back-to-back user agent (B2BUA), and so forth. The SBC 108(1) may be configured to transcode or otherwise modify data packets generated by communication devices 104 or source network elements 106 in the first network 102(1) or received from other networks 102.

One or more of the first communication device 104(1) or the second communication device 104(2) may be used to initiate a communication, such as a VoIP call, with one or more other communication devices 104 associated with other networks 102. For example, FIG. 1 depicts a third communication device 104(3), which may be associated with one or more of a second network 102(2) or a third network 102(3). In other implementations, the third communication device 104(3) may be disassociated from the second network 102(2) and the third network 102(3). For example, the third communication device 104(3) may communicate with one or more of the second network 102(2) or the third network 102(3) via telecommunication cables. A SBC 108 or another device associated with one or more of the second network 102(2) or the third network 102(3) may transcode data packets, such as voice packets 110 associated with a VoIP communication, to a format able to be communicated to the third communication device 104(3) via a local, cable-based telephone system.

To initiate a communication with the third communication device 104(3), one or more of the first communication device 104(1) or the second communication device 104(2) may initiate one or more of a SIP connection or a RTP connection with the second network 102(2) or the third network 102(3). The quality of a communication between the first network 102(1) and the third communication device 104(3), routed through the second network 102(2), may differ from the quality of a communication between the first network 102(1) and the third communication device 104(3), routed through the third network 102(3). For example, the second network 102(2) may include a second SBC 108(2) configured to receive voice packets 110 or other data packets from the first network 102(1). The second SBC 108(2) may communicate the received voice packets 110 to one or more destination network elements 112(1) associated with the second network 102(2). Each of the destination network elements 112(1) may introduce a quantity of latency, jitter, or packet loss to the communication. However, this metric information associated with the destination network elements 112(1) may not be visible to a user of the first network 102(1) due to the destination network elements 112(1) being part of a separate network 102. The third network 102(3) may include a third SBC 108(3) configured to receive voice packets 110 or other data packets from the first network 102(1). The third SBC 108(3) may communicate the received voice packets 110 to one or more destination network elements 112(2) associated with the third network 102(3). The latency, jitter, and packet loss associated with the destination network elements 112(2) associated with the third network 102(3) may differ from that of the destination network elements 112(1) associated with the second network 102(2). Therefore, the network 102 through which a communication to the third communication device 104(3) is routed may significantly impact the quality of the communication.

In some implementations, a user associated with the first network 102(1) may be able to determine latency, jitter, packet loss, and other metric data associated with the second SBC 108(2) and third SBC 108(3). However, the type, quantity, identity, and metric information associated with the destination network elements 112 may not be able to be determined by the user of the first network 102(1). For example, a communication initiated with the second SBC 108(2) may appear to have a lower amount of latency associated with the communication when compared to a communication initiated with the third SBC 108(3). However, latency associated with the destination network elements 112(1) of the second network 102(2), which may be unknown to a user of the first network 102(1), may exceed that associated with the destination network elements 112(2) of the third network 102(3). Therefore, a communication with the third communication device 104(3) routed through the second network 102(2) may be of a lower quality (e.g., greater latency or jitter, or a greater quantity of lost data packets) than a communication routed through the third network 102(3).

An interrogation module 114 associated with one or more of the source network elements 106, the first SBC 108(1), or the communication devices 104 associated with the first network 102(1) may be used to provide interrogatory data 116 to the second SBC 108(2) and the third SBC 108(3). The interrogatory data 116 may be used to determine metric data 118 (e.g., latency, jitter, packet loss, and so forth) associated with the endpoint of the SIP or RTP connection or one or more intermediate devices. In some implementations, the third communication device 104(3) may be a part of the second network 102(2) or the third network 102(3), and the endpoint of the connection may be the third communication device 104(3). In other implementations, one or more of the destination network elements 112 or an additional SBC 108 associated with the second network 102(2) or the third network 102(3) may be the endpoint of the connection, from which a communication may egress to reach the third communication device 104(3).

In some implementations, the interrogatory data 116 may include one or more interrogatory packets, provided from the first network 102(1) to one or more of the second network 102(2) or the third network 102(3) via an existing SIP or RTP connection. A SIP connection may include a connection established using the protocol standardized under request for comments (RFC) 3261 in 2002 by the Internet Engineering Task force (IETF). A SIP connection may also be established according to one or more of RFC 2543 (published by the IETF in 1999) and RFC 3262 (published by the IETF in 2002). A RTP connection may include a connection established according to RFC 3550, published in 2003 by the IETF. A RTP connection may also be established according to RFC 1889 (published in 1996 by the IETF). A communication module 120 associated with the first network 102(1) may convert audio or video data received from one or more of the first communication device 104(1) or the second communication device 104(2) to voice packets 110. The voice packets 110 may be provided to other communication devices 104 associated with other networks 102 via a SIP or RTP connection. The interrogation module 114 may provide one or more interrogatory packets to the second network 102(2) and the third network 102(3) in-line, via the existing connection that is currently being used to provide voice packets 110 between the networks 102. Interrogatory packets may be provided between networks 102 in the same manner that the voice packets 110 are provided. For example, the interrogatory packets and the voice packets 110 may share one or more common packet characteristics, such as a length or a data structure. Destination network elements 112 associated with the second network 102(2) and the third network 102(3) that are not configured to identify or process interrogatory data 116 may route the interrogatory packets in the same manner as voice packets 110, such as by providing the interrogatory packets to subsequent devices. Destination network elements 112 associated with the second network 102(2) and the third network 102(3) that are configured to process interrogatory data 116 may remove the interrogatory data 116 from the data stream of the SIP or RTP connection for processing. Responsive to the interrogatory data 116, one or more devices associated with the second network 102(2) and the third network 102(3) may generate response data 122 and provide the response data 122 to the first network 102(1).

The interrogatory data 116 may include a signature and one or more identifiers indicative of the first network 102(1). A signature may include a cryptographic signature, a digital signature, or another type of signed credentials. The interrogatory data 116 may further include source network element data indicative of one or more of the source network elements 106. The interrogatory data 116 may also include a request for one or more types of metric data 118 associated with one or more devices of the second network 102(2), the third network 102(3), or both. For example, interrogatory data 116 provided to the second network 102(2) may request one or more of latency data, jitter data, or packet loss data associated with the second SBC 108(2) or one or more of the destination network elements 112(1) associated with the second network 102(2). Continuing the example, interrogatory data 116 provided to the third network 102(3) may request one or more of latency data, jitter data, or packet loss data associated with the third SBC 108(3) or one or more of the destination network elements 112(2) associated with the third network 102(3). In some implementations, the third communication device 104(3) may be associated with one or more of the second network 102(2) or the third network 102(3), and the interrogatory data 116 may include a request for metric data 118 associated with the third communication device 104(3).

As described previously, the interrogatory data 116 may be provided as interrogatory packets via one or more SIP or RTP connections between the first network 102(1) and one or more of the second network 102(2) or the third network 102(3). In some implementations, one or more of the second SBC 108(2), the third SBC 108(3), the destination network elements 112(1) associated with the second network 102(2), or the destination network elements 112(2) associated with the third network 102(3) may not be configured to identify or process the interrogatory packets. Devices unable to process the interrogatory packets may communicate the interrogatory packets to a subsequent device.

When an interrogatory packet is identified by a device configured to process the interrogatory packet, the device may generate response data 122. For example, the second SBC 108(2), the third SBC 108(3), one or more destination network elements 112(1) associated with the second network 102(2), or one or more destination network elements 112(2) associated with the third network 102(3) may identify an interrogatory packet. An interrogatory packet may be identified based on the signature, one or more identifiers, or the source network data of the interrogatory packet. In other implementations, the interrogatory data 116 may include one or more other identifying elements. For example, an interrogatory packet may be provided with a timestamp that identifies the packet as an interrogatory packet. For example, the interrogatory packet may be provided with an improper timestamp, or a timestamp may be absent from the interrogatory packet. The absence of a timestamp or the presence of an improper timestamp may prevent devices that are not configured to process interrogatory data 116 from attempting to process the interrogatory packet. As another example, an interrogatory packet may be provided with an identifier in an existing field common to voice packets 110, such as a codec field. Continuing the example, a codec identifier (e.g., an alphanumeric string) that does not correspond to a particular codec may be inserted in the codec field to identify the interrogatory packet as a packet carrying interrogatory data 116. One or more devices associated with the second network 102(2) or the third network 102(3) may be configured to identify an interrogatory packet based on the timestamp, a codec identifier, or other features of the interrogatory data 116.

In some implementations, response data 122 provided by the second network 102(2) or the third network 102(3) may include a format similar to that of the interrogatory data 116. For example, response data 122(1) generated by the second network 102(2) may be provided as response packets having a signature or one or more other identifiers indicative of the second network 102(2), destination network element data indicative of the destination network elements 112(1), and metric data 118 responsive to the request for metric data 118 provided in the interrogatory data 116. Continuing the example, response data 122(2) generated by the third network 102(3) may be provided as response packets having a signature or other identifiers indicative of the third network 102(3), destination network element data indicative of the destination network elements 112(2), and metric data 118 responsive to the request for metric data 118 provided in the interrogatory data 116.

A validation module 124 associated with the first network 102(1) may determine the accuracy or validity of the response data 122. The validation module 124 may access communication data 126 associated with the second network 102(2) and the third network 102(3). The validation module 124 may determine correspondence between the communication data 126 and the received response data 122. For example, the communication data 126 may include previously-received response data 122 from one or more of the second network 102(2) or the third network 102(3). Continuing the example, one or more of the signatures or the destination network element data of the response data 122 may be compared with previously-received signatures and destination network element data of the communication data 126. Destination network element data indicative of destination network elements 112 not previously associated with the second network 102(2) or the third network 102(3) may indicate that the response data 122 is erroneous, inaccurate, invalid, or fraudulent. As another example, the communication data 126 may include call detail records (CDR) associated with previous communications between the first network 102(1) and one or more of the second network 102(2) or the third network 102(3). If the response data 122 includes a signature or destination network element data that does not correspond to the communication data 126, this determination may indicate erroneous, inaccurate, invalid, or fraudulent response data 122. Conversely, correspondence between the response data 122 and known or expected signatures or destination network element data, stored as communication data 126, may indicate that the response data 122 is accurate and may validate that the response data 122 was generated by one or more of the second network 102(2) or the third network 102(3).

The response data 122 may include metric data 118, such as latency data, jitter data, or packet loss data associated with one or more devices of the second network 102(2), the third network 102(3), or both. For example, first response data 122(1) received from the second network 102(2) may include one or more of latency data, jitter data, or packet loss data associated with one or more of the second SBC 108(2) or the destination network elements 112(1) associated with the second network 102(2). Continuing the example, second response data 122(2) received from the third network 102(3) may include one or more of latency data, jitter data, or packet loss data associated with one or more of the third SBC 108(3) or the destination network elements 112(2) associated with the third network 102(3). The metric data 118 associated with the response data 122 may include all or a portion of the metric data 118 requested using the interrogatory data 116. Use of the interrogatory data 116 to obtain metric data 118 associated with the destination network elements 112 may enable latency, jitter, and packet loss data associated with the destination network elements 112 to be determined by a user or device associated with the first network 102(1). The metric data 118 may then be used to determine a quality metric 128 associated with communications routed through the second network 102(2) and the third network 102(3). The quality metric 128 may be a qualitative or quantitative measurement of a connection or communication, based on the metric data 118, such as latency data, jitter data, packet loss data, or other metric data 118. In some implementations, all or a portion of the metric data 118 may, itself, be the quality metric 128. The networks 102 with which subsequent SIP connections or other types of connections, such as RTP connections, are initiated may be selected based on the quality metrics 128 associated with the second network 102(2) and the third network 102(3).

Received metric data 118 corresponding to the second network 102(2) and the third network 102(3) may also be used to identify potential deficiencies within a network 102. For example, if the latency associated with a device within a network 102 exceeds a threshold value, such as a value agreed upon in a SLA, notifications may be provided to users associated with the network 102, as described below.

A metric processing module 130 may receive the response data 122 from one or more networks 102 and may store at least a portion of the received response data 122 in association with the communication data 126. For example, the metric processing module 130 may determine a network 102 or one or more devices associated with the response data 122 based at least partially on signatures or destination network element data associated with the response data 122. The metric processing module 130 may also determine a communication type associated with the connection from which the response data 122 is received. A communication type may include a type of connection (e.g., a SIP connection), a type of communication (e.g., a VoIP call), a location or region associated with the communication, and so forth. The metric processing module 130 may further determine one or more types of devices (e.g., destination network elements 112) or one or more specific devices associated with a communication. Additionally, the metric processing module 130 may determine one or more of latency data, jitter data, packet loss data, or other types of metric data 118 from the response data 122. The metric data 118 may be stored in association with a communication type, a specific device, a type of device, and so forth, as communication data 126.

As described previously, the communication data 126 may be used to determine quality metrics 128 associated with one or more networks 102 to facilitate selection of a network 102 having the greatest quality (e.g., least latency, least jitter, least quantity of lost packets) when initiating a subsequent communication. For example, the communication module 120 may determine a quality metric 128 associated with one or more networks 102 prior to initiating one or more of a SIP connection or a RTP connection. The connection may be initiated with the second network 102(2), the third network 102(3), or other networks based on the type of communication, the destination of the communication, and the metric data 118 received from the networks 102 as response data 122. For example, if the destination network elements 112(1) associated with the second network 102(2) have a greater amount of associated latency than the destination network elements 112(2) associated with the third network 102(3), the communication module 120 may initiate a SIP connection with the third network 102(3).

The communication data 126 may also be used to determine potential errors, damage, or other deficiencies that may impact communication quality associated with one or more networks 102. For example, a notification module 132 may access threshold metric values associated with the one or more networks 102. The notification module 132 may determine that received metric data 118 associated with one or more networks 102 deviates from the threshold metric values by an amount equal to or exceeding a threshold variance. In some implementations, the threshold metric values and the threshold variance may include values set forth in a SLA. Responsive to the deviation, the notification module 132 may generate one or more notifications and provide the notifications to one or more devices associated with one or more of the first network 102(1), the second network 102(2), the third network 102(3), or other networks 102. A notification may include a message, an alert, an alarm, and so forth, indicating a deviation in one or more metric values associated with a network 102 or one or more devices.

Figure 2:
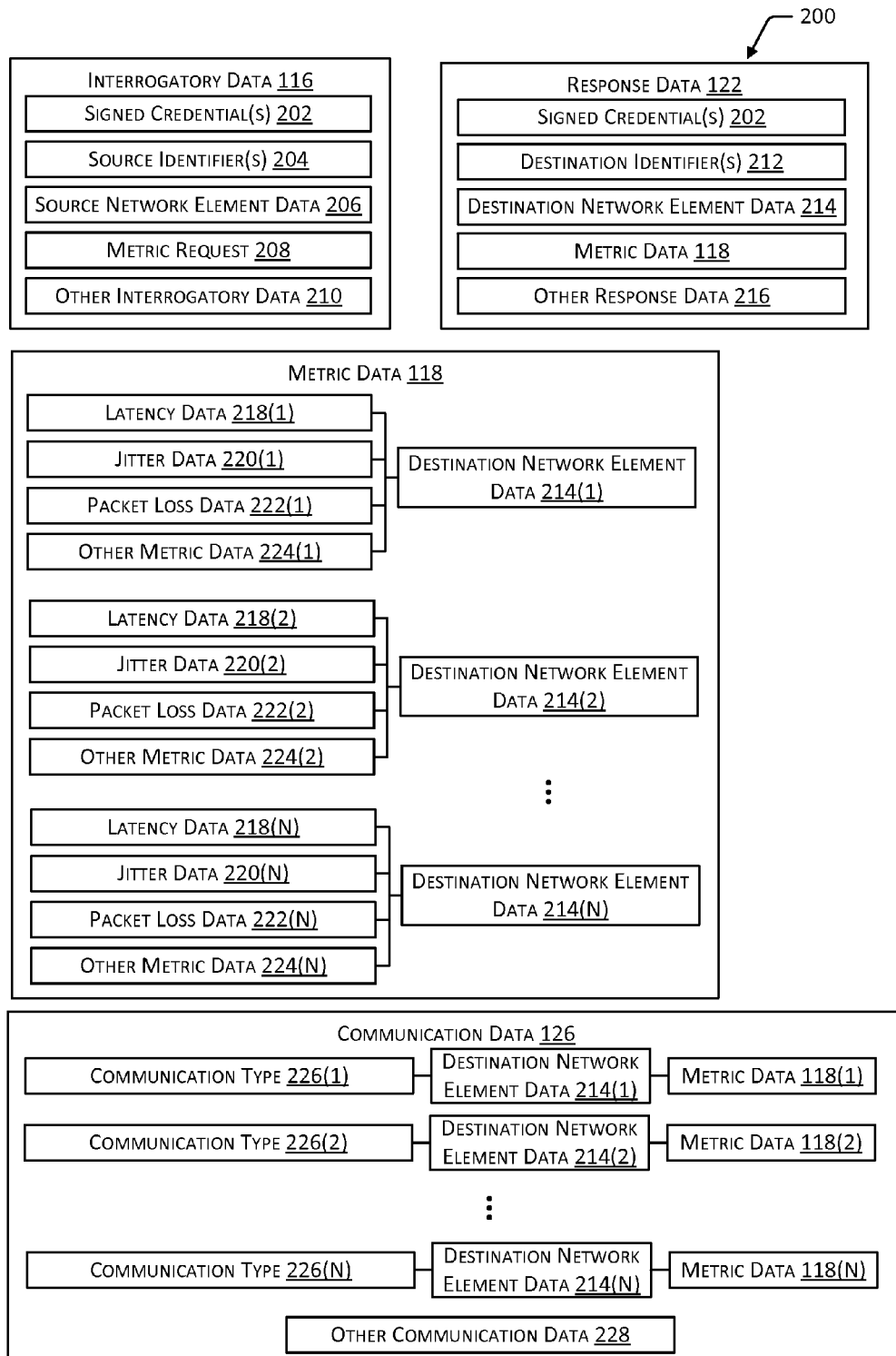
FIG. 2 is a block diagram illustrating examples of interrogatory data, response data, metric data, and communication data.

FIG. 2 is a block diagram 200 illustrating examples of interrogatory data 116, response data 122, metric data 118, and communication data 126.

The interrogatory data 116 may be generated by an interrogation module 114, associated with one or more devices within a first network 102(1). The interrogatory data 116 may be used to request metric data 118 associated with one or more devices within another network 102 to which a communication may be sent or routed. For example, one or more devices, such as SBCs 108 or destination network elements 112, may have latency, jitter, packet loss, or other metric data 118 associated with the devices. As described previously, the metric data 118 associated with such devices may not be visible to a user of the first network 102(1) prior to providing the interrogatory data 116. Interrogatory data 116 may be provided to one or more devices within a network 102 to cause generation of response data 122 by those devices or other devices within the network 102. The response data 122 may be used to communicate the metric data 118 to the first network 102(1).

In some implementations, the interrogatory data 116 may be provided as one or multiple packets, in-line, using an existing SIP or RTP connection. An interrogatory packet may be transmitted between devices within a network 102 in the same manner as voice packets 110 or data packets. Devices that are not configured to process interrogatory packets may be unable to distinguish the interrogatory packet from a voice packet 110 or data packet, and may provide the interrogatory packet to a subsequent device in the manner of a voice packet 110. Devices configured to process interrogatory packets may identify one or more features of the interrogatory packet so that the device(s) may remove the interrogatory packet from the data stream for processing. For example, an interrogatory packet may include timestamp data, an identifier within a codec field, or another feature to enable devices to identify and process the interrogatory packet.

The interrogatory data 116 may include one or more signed credentials 202, such as digital certificates or other digitally signed data, cryptographic signatures, and so forth. The signed credentials 202 may be used to verify the accuracy and validity of the interrogatory data 116. For example, a device within a network 102 configured to identify and process interrogatory data 116 may identify the interrogatory data 116 using one or more signed credentials 202. In other implementations, a device configured to process interrogatory data 116 may refrain from processing the interrogatory data 116 in the absence of a valid signed credential 202.

The interrogatory data 116 may include one or more source identifiers 204. Source identifiers 204 may include any manner of alphanumeric data, image data, audio data, or video data. The source identifiers 204 may be indicative of the network 102 or one or more devices within the network 102, from which the interrogatory data 116 was generated. In some implementations, a source identifier 204 may include data that may be recognized by a computing device but may not necessarily be recognizable by a user. For example, a source identifier 204 may include a machine-readable code or other type of data. Any number or type of source identifiers 204, indicative of one or multiple devices within a network 102, may be included in the interrogatory data 116. In some implementations, a device configured to process interrogatory data 116 may determine receipt of the interrogatory data 116 using one or more source identifiers 204.

The interrogatory data 116 may also include source network element data 206. The source network element data 206 may be indicative of one or more source network elements 106 within a network 102. For example, the source network element data 206 may include a type, a location, or similar information associated with a SBC 108, source network elements 106, or other devices of a network 102. Continuing the example, the source network element data 206 may include an alphanumeric string, such as a reference number or tag, identifying one or more devices associated with the network 102. In some implementations, a device configured to process interrogatory data 116 may determine receipt of the interrogatory data 116 using at least a portion of the source network element data 206.

The interrogatory data 116 may further include a metric request 208. A metric request 208 may request one or more types of metric data 118 associated with one or more devices within a selected network 102. For example, the metric request 208 may request metric data 118 associated with each destination network element 112 within a network 102, a portion of the destination network elements 112, a single destination network element 112 or other device, a device associated with the endpoint or egress point of a connection, and so forth. The metric request 208 may request metric data 118 related to latency, jitter, packet loss, or any combination of this information or other metric data 118. The metric request 208 may include a format or data structure configured to be processed by a receiving device in a manner that enables the receiving device to determine the requested metric data 118 and the associated devices within the network 102. Responsive to the metric request 208, a receiving device may generate and provide response data 122.

Other interrogatory data 210 may include other types of identifiers, such as an alphanumeric string within a field of an interrogatory packet, the presence, absence, or characteristics (e.g., accuracy) of a timestamp, and so forth. For example, devices may be configured to refrain from processing data packets that lack a timestamp. An interrogatory packet may be generated without a timestamp to prevent a receiving device that is not configured to process interrogatory data 116 from attempting to process the interrogatory packet. A receiving device configured to determine and process interrogatory data 116 may identify an interrogatory packet by the lack of a timestamp or the presence or absence of one or more features associated with the timestamp. As another example, an interrogatory packet may include an identifier within a codec field that does not correspond to an existing codec. Other fields within an interrogatory packet may be populated with information identifying the interrogatory data 116 in a similar manner. Devices that are not configured to process interrogatory data 116 may refrain from attempting to process the interrogatory packet due to the lack of a codec that corresponds to the identifier within the codec field. A receiving device configured to process interrogatory data 116 may identify the interrogatory packet by the presence or absence of a string or other identifier within the codec field or another field of the interrogatory packet.

In some implementations, other interrogatory data 210 may include metric data 118 associated with one or more of the source network elements 106 or other devices associated with the network 102. For example, multiple networks 102 may exchange metric data 118 simultaneously using interrogatory data 116 and a response data 122. An interrogatory packet from a first network 102(1) may include metric data 118 requested by a second network 102(2), while also requesting metric data 118 from the second network 102(2). Response data 122(1) from the second network 102(2) may include the requested metric data 118 as well as a request for metric data 118 from the first network 102(1).

The response data 122 may be generated by one or more devices associated with a network 102 receiving the interrogatory data 116. In some implementations, the response data 122 may have a format that is the same or similar to that of the interrogatory data 116. For example, the response data 122 may include one or more response packets that may be communicated in-line, using an existing SIP connection. The response packet(s) may be provided between devices in the manner that voice packets 110 or other data packets are provided until reaching a device configured to identify and process the response packet(s).

The response data 122 may include one or more signed credentials 202, such as digital certificates, cryptographic signatures, and so forth. The signed credentials 202 may be used to verify the accuracy and validity of the response data 122. For example, a digital certificate may be used to ensure that a received response packet was not provided by an unauthorized party, preventing the receipt of false or inaccurate metric data 118. Continuing the example, a device configured to process response data 122 may refrain from processing the response data 122 in the absence of a valid signed credential 202. In some implementations, one or more signed credentials 202 may be used to identify a packet containing the response data 122 among voice packets 110.

The response data 122 may include one or more destination identifiers 212. Destination identifiers 212 may include one or more of alphanumeric data, image data, audio data, or video data, indicative of the network 102 or one or more devices within the network 102, from which the response data 122 was generated. In some implementations, a device configured to process the response data 122 may determine receipt of the response data 122 using one or more destination identifiers 212.

The response data 122 may also include destination network element data 214. The destination network element data 214 may be indicative of one or more destination network elements 112 within a network 102. Destination network element data 214 may include a type, a location, or similar information associated with a SBC 108, destination network elements 112, or other devices of a network 102. For example, destination network element data 214 may include an identifier, such as an alphanumeric string or tag, indicative of one or more destination network elements 112. In some implementations, a device configured to process response data 122 may determine receipt of the response data 122 using at least a portion of the destination network element data 214. As described previously with regard to FIG. 1, in some implementations, a validation module 124 may determine the accuracy or validity of response data 122 based at least partially on the destination network element data 214. For example, a network 102 may be owned by a party known to have a presence within a first geographic region. This presence may be determined, for example, using communication data 126 indicative of previous communications associated with the network 102. Destination network element data 214 indicative of destination network elements 112 having a type or region that does not correspond to the communication data 126 may indicate erroneous or fraudulent response data 122.

The response data 122 may further include the metric data 118 requested by the metric request 208 of the interrogatory data 116. In some implementations, a device receiving the interrogatory data 116 may provide metric data 118 associated with the specific receiving device. In other implementations, the device receiving the interrogatory data 116 may provide metric data 118 associated with multiple devices within the network 102. For example, a SBC 108 may receive and process interrogatory data 116. Responsive to the metric request 208, the SBC 108 or an associated device may determine metric data 118 for at least a portion of the devices indicated in the metric request 208. The SBC 108 may then provide response data 122 that includes at least a portion of the requested metric data 118 to the network 102 requesting the metric data 118. As another example, the SBC 108 associated with a network 102 may receive the interrogatory data 116 and provide the interrogatory data 116 to one or more destination network elements 112 in the same manner as a voice packet 110. The destination network element(s) 112 may provide the interrogatory data 116 to other destination network elements 112 until the interrogatory data 116 is received by a device configured to identify and process the interrogatory data 116. The receiving device, or another device in communication with the receiving device, may determine the metric data 118 that corresponds to the metric request 208 and generate the response data 122.

Other response data 216 may include other types of identifiers, such as an alphanumeric string within a field of a response packet or the presence, absence, or accuracy of a timestamp, as described previously with regard to identifiers for interrogatory packets. Other response data 216 may also include metric data 118 not associated with the metric request 208 or notifications indicative of a current status of one or more devices in the network 102. For example, if damage to a device has temporarily increased latency within a network 102, a notification, responsive to the interrogatory data 116, regarding the status of one or more devices, may be provided to inform users attempting to initiate a communication.

The metric data 118 may include one or more of latency data 218, jitter data 220, packet loss data 222, or other metric data 224. Latency data 218 may include a measurement of time between stimulation and response of one or more devices, such as a SBC 108 or destination network element 112, associated with a network 102. The latency data 218 may include a quantitative or qualitative measurement. For example, latency data 218 may include a numerical length of time, such as 100 ms, or a qualitative description, such as "low," "moderate," or "high" latency. In some implementations, latency data 218 may include one or more latency values associated with a particular device at one or more particular time intervals. For example, the received metric data 118 may include latency values for one or more devices at periodic instances over a length of time. In other implementations, latency data 218 may include one or more latency values associated with multiple devices. For example, the latency data 218 may include a measurement of latency between a SBC 108 within a network 102 and a device associated with an egress point of the communication. As another example, the latency data 218 for a particular device may include a measurement of latency between the SBC 108 and that particular device.

Jitter data 220 may include a quantitative or qualitative measurement of deviation from the true periodicity of a signal (e.g., phase noise). For example, if two data packets are received out of sequence, the jitter data 220 may include a quantitative measurement of the length of time between the time that a data packet is received and the place of that data packet within the sequence of data packets. In another example, the jitter data 220 may include a quantity of packets that deviate from the periodicity of the signal. The jitter data 220 may include jitter values associated with a particular device or values associated with multiple devices.

Packet loss data 222 may include a quantitative or qualitative measurement of packets of data that fail to reach an intended destination. For example, the packet loss data 222 may include one or more of a count of delivered or undelivered packets, a percentage of delivered or undelivered packets, or the total number of packets sent. The packet loss data 222 may include values associated with a particular device or values associated with multiple devices.

Other metric data 224 may include other information that may affect the quality of a communication, such as the bandwidth, type, or status of one or more devices within a network 102, or the type of communication associated with the metric data 118. Other metric data 224 may include frequencies that one or more devices utilize, a codec or other software used to process data, the location of one or more devices, and so forth. In some implementations, other metric data 224 may include measurements of noise, such as a signal to noise ratio. Other metric data 224 may also include one or more threshold values. For example, a threshold value may indicate a latency, jitter, or packet loss value corresponding to a communication having an acceptable quality. Determination of deviation of one or more of the latency data 218, jitter data 220, packet loss data 222, or other metric data 224 from one or more threshold values may cause one or more notifications to be generated. Deviation of metric data 118 from threshold values may be also used to determine the potential quality of a subsequent connection with a network 102.

One or more of the latency data 218, jitter data 220, packet loss data 222, or other metric data 224 may be stored in association with destination network element data 214. For example, first destination network element data 214(1) may include an identifier that corresponds to a particular destination network element 112. First latency data 218(1) may include latency values associated with that destination network element 112, such as the delay between stimulation and response of the destination network element 112. In some implementations, the first latency data 218(1) may include a measurement of latency across the destination network element 112 and one or more additional devices within the corresponding network 102. First jitter data 220(1) may include jitter values associated with the destination network element 112, such as the number of packets that deviate from the true periodicity of a signal by more than a threshold value or the length of time by which one or more packets deviate from the true periodicity. In some implementations, the first jitter data 220(1) may be associated with multiple devices rather than a single destination network element 112. First packet loss data 222(1) may include packet loss values, such as a number of dropped packets, associated with the destination network element 112 or a group of network elements. The first other metric data 224(1) may similarly include metric values associated with the destination network element 112 corresponding to the first destination network element data 214(1).

In a similar manner, second destination network element data 214(2) may include an identifier indicative of a second destination network element 112. The second destination network element data 214(2) may be stored in association with second latency data 218(2), second jitter data 220(2), second packet loss 222(2), and second other metric data 224(2). Any number of destination network element data 214(N) may be stored in association with any number of corresponding latency data 218(N), jitter data 220(N), packet loss data 222(N), or other metric data 224(N). As used in this disclosure, letters in parenthesis such as "(N)" indicate an integer value. FIG. 2 depicts the latency data 218, jitter data 220, packet loss data 222, and other metric data 224 stored in association with destination network element data 214. However, in other implementations, latency data 218, jitter data 220, packet loss data 222, and other metric data 224 may be stored in association with a communication type 226, a geographic region, and so forth.

The metric data 118 for multiple devices in a network 102 may be used to determine a quality metric 128 associated with the network 102. The quality metric 128 may be a qualitative or quantitative measurement of a connection or communication, based on the latency data 218, jitter data 220, packet loss data 222, and other metric data 224. In some implementations, one or more of the latency data 218, jitter data 220, packet loss data 222, or other metric data 224 may, itself, be a quality metric 128. In other implementations, the metric processing module 130 may determine a quality metric 128 associated with a particular network 102 or one or more devices.

The communication data 126 may include metric data 118 for one or more destination network elements 112 stored in association with one or more communication types 226. For example, metric data 118 received over time from one or more networks 102 may be stored in a data store. Each interrogatory data 116 and each response data 122 received responsive to the interrogatory data 116 may be associated with a particular type of communication. For example, particular types of communication may include a VoIP communication, a VoLTE communication, a communication to a particular country or geographical region, a communication conducted using a SIP or RTP connection, a communication conducted using a SIP or RTP connection for a first portion and a local telephone network for a second portion, and so forth. The metric data 118 received in the response data 122 may be associated with a particular communication type 226. For example, certain networks 102 and certain destination network elements 112 may experience a first quantity of latency when routing a communication of first communication type 226 and a second quantity of latency when routing a communication of a second communication type 226.

FIG. 2 depicts the communication data 126 including first metric data 118(1) stored in association with a first communication type 226(1) and first destination network element data 214(1). The first destination network element data 214(1) may be indicative of one or more destination network elements 112 or other devices within a network 102 through which a communication was provided. Each device represented by the destination network element data 214(1) may have one or more of latency data 218, jitter data 220, packet loss data 222, or other metric data 224 associated with the device.

The first metric data 118(1) may include metric data 118 associated with one or multiple previous communications. For example, multiple communications of the first communication type 226(1) may be executed over time, and metric data 118 associated with each communication may be received and stored (e.g., in a data store) in association with the first communication type 226(1). Similarly, the first destination network element data 214(1) may include first destination network element data 214(1) associated with one or multiple sets of destination network elements 112. For example, a first communication may be routed through a first set of destination network elements 112 within a network 102, while a second communication may be routed through a second set of destination network elements 112 within the network 102.

In a similar manner, second metric data 118(2) may be stored in association with a second communication type 226(2) and second destination network element data 214(2). The second metric data 118(2) may be determined from one or multiple communications of the second communication type 226(2). The second destination network element data 214(2) may be indicative of one or multiple sets of destination network elements 112. Any number of metric data 118(N) may be stored in association with any number of communication types 226(N) and destination network element data 214(N) to form the communication data 126.

The communication data 126 may be used to determine a quality metric 128 associated with one or more networks 102 that may be used to facilitate a subsequent communication. A quality metric 128 may include a quantitative or qualitative prediction of the quality of a communication. The quality of a communication may be determined in part by the amount of latency, jitter, and packet loss that occurs during the communication. In some implementations, the quality metric 128 may include a numerical or verbal expression of quality. In other implementations, the quality metric 128 may include an ordering or ranking of networks 102. As described previously with regard to FIG. 1, a communication module 120 may access the communication data 126 prior to initiating a SIP connection or another type of connection with a network 102. The communication module 120 may determine a quality metric 128 associated with one or more networks 102 based on the communication type 226 of the communication being initiated by the communication module 120. Based on the quality metric 128 associated with the one or more networks 102, the communication module 120 may initiate a connection with the network 102 that may facilitate a communication having the greatest quality (e.g., least latency, packet loss, or jitter). In some implementations, if multiple networks 102 have an identical or similar quality metric 128, such as quality metrics 128 within a threshold value of one another, a connection may be initiated with a network 102 based on other factors, such as the cost (e.g., price per minute) associated with a communication. For example, data indicative of the cost associated with using a network 102 may be received from the network 102, stored in a data store, or otherwise accessible.

Other communication data 228 may include a time or a range of times associated with a communication, a current status of one or more devices or geographical regions, and so forth. For example, inclement weather in a region may affect the metric data 118 received from that region. As another example, increased traffic during certain days or times may cause a network 102 to facilitate high quality communications during times when a large quantity of bandwidth is available and lower quality communications during times corresponding to peak use of the network 102.

Figure 3:
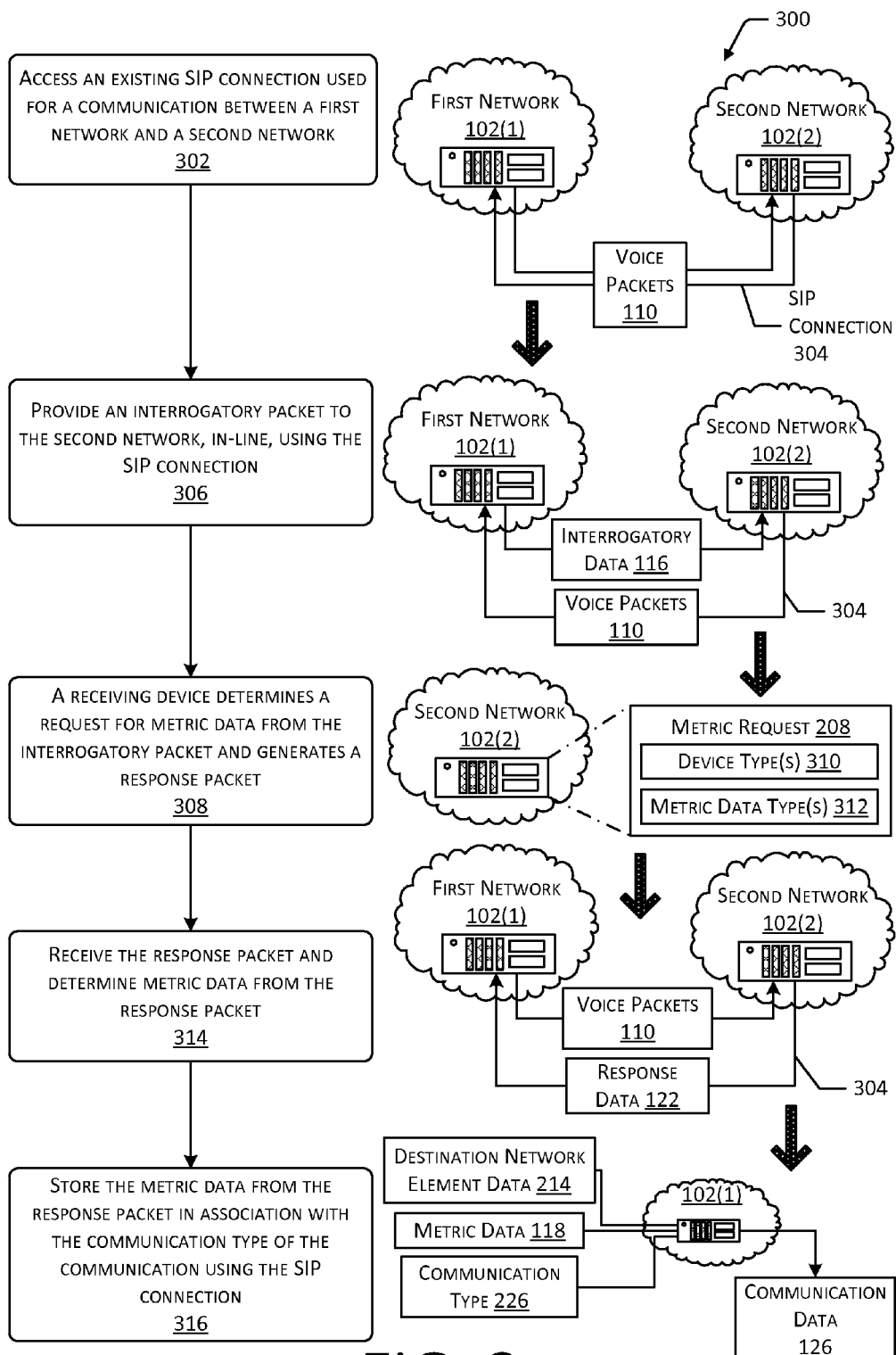
FIG. 3 illustrates a method for providing interrogatory data as well as receiving and storing metric data received responsive to the interrogatory data.

FIG. 3 illustrates a method 300 for providing interrogatory data 116 as well as receiving and storing metric data 118 received responsive to the interrogatory data 116. At 302, an existing SIP connection 304 used for a communication between a first network 102(1) and a second network 102(2) may be accessed. In other implementations, an existing RTP connection may be accessed. For example, a communication device 104 associated with the first network 102(1) may have previously initiated a VoIP or VoLTE call to a communication device 104 associated with the second network 102(2). SBCs 108 associated with one or more of the first network 102(1), the second network 102(2), or other networks 102 may receive, process, and transcode signals from other networks 102. For example, a SBC 108 or one or more source network elements 106 associated with the first network 102(1) may receive audio or video data from a communication device 104 and generate voice packets 110 to be provided to the second network 102(2). A SBC 108 associated with the second network 102(2) may receive the voice packets 110 and process the voice packets 110. In another implementation, the SBC 108 associated with the second network 102(2) may provide the voice packets 110 to one or more destination network elements 112, which may process the voice packets 110. Processed voice packets 110 may be emitted by the communication device 104 associated with the second network 102(2) as audible sound. Similarly, audible sound received by the communication device 104 associated with the second network 102(2) may be used to produce voice packets 110 to be provided to the first network 102(1). A SBC 108, source network elements 106, or other devices may process the voice packets 110 from the second network 102(2). Processed voice packets 110 may be emitted by the communication device 104 associated with the first network 102(1) as audible sound. Metric values, such as latency, jitter, packet loss, and so forth, may affect the quality of the communication using the SIP connection 304. For example, high latency in destination network elements 112 associated with the second network 102(2) may result in a significant delay between the time that a first user provides audible sound to a first communication device 104(1) and the time that a second user receives the audible sound at a second communication device 104(2). High packet loss may result in portions of the communication that do not reach one of the parties.

At 306, an interrogatory packet may be provided from the first network 102(1) to the second network 102(2). The interrogatory packet may be provided in-line, using one or more of the SIP connection 304 or an RTP connection. For example, interrogatory data 116, having a format similar to that of a voice packet 110, may be injected into the communication between the first network 102(1) and the second network 102(2). An interrogatory packet may have a length corresponding to that of a voice packet 110, such as from 10 ms to 30 ms. Due to the interrogatory packet having characteristics similar to those of the voice packets 110, the interrogatory data 116 may be provided between devices within the first network 102(1) and second network 102(2) in the same manner as the voice packets 110. For example, devices that are not configured to identify or process an interrogatory packet may fail to differentiate the interrogatory packet from the voice packets 110 and may transmit the interrogatory packet to a subsequent device. In some implementations, devices configured to identify or process an interrogatory packet may remove the interrogatory packet from the data stream within the SIP connection 304. If no receiving device properly identifies and removes the interrogatory packet, such as due to an error in the interrogatory packet or the failure of one or more devices, the interrogatory packet may reach a communication device 104. Due to the fact that the communication device 104 may not be configured to process the interrogatory packet, the interrogatory packet may be perceived as a dropped packet. For example, a user of a communication device 104 may perceive a short duration (e.g., from 10-30 ms) of silence due to the interrogatory packet having been received by a communication device 104 unable to process the interrogatory packet.

At 308, a receiving device associated with the second network 102(2), such as a SBC 108 or destination network element 112, may determine a request for metric data 118 from the interrogatory packet and generate a response packet for providing response data 122 to the first network 102(1). A metric request 208 may include one or more device types 310 or one or more metric data types 312.

Device types 310 may include one or more specific devices, which may be identified by various identifiers, such as corresponding destination network element data 214. In some implementations, device types 310 may include one or more sets of devices, such as devices within a particular geographic region, devices of a certain type (e.g., servers, modems, routers, switches, and so forth), devices associated with particular manufacturers, and so forth. For example, a metric request 208 may request metric data 118 associated with every destination network element 112 within a network 102, every SBC 108 within the network 102, each destination network element 112 used to provide a communication to a particular geographic region, each destination network element 112 used to facilitate a particular communication type 226, and so forth. In some implementations, a metric request 208 may not include device types 310, and the response data 122 may include metric data 118 corresponding to the specific device receiving the interrogatory data 116. In other implementations, a metric request 208 may not include device types 310, and the response data 122 may include metric data 118 corresponding to each device within a network 102.

Metric data types 312 may include one or more types of metric data 118 requested by the first network 102(1). For example, a metric request 208 may request metric data 118 that includes one or more of latency data 218, jitter data 220, packet loss data 222, or other metric data 224. In some implementations, a metric request 208 may lack one or more particular metric data types 312, and the response data 122 may include metric data 118 corresponding to a particular metric data type 312, such as latency data 218. In other implementations, a metric request 208 may lack one or more particular metric data types 312, and the response data 122 may include each of the latency data 218, jitter data 220, and packet loss data 222.

At 314, the response packet generated by the second network 102(2) may be received by the first network 102(1). One or more devices associated with the first network 102(1) may determine metric data 118 from the response packet. For example, response data 122 that includes at least a portion of the metric data 118 corresponding to the metric request 208 may be provided in-line to the first network 102(1) as a packet having characteristics similar to those of the voice packets 110. Devices associated with the first network 102(1) that are not configured to process the response packet may fail to differentiate the response packet from the voice packets 110. Such devices may provide the response packet to a subsequent device in the same manner as a voice packet 110. A device configured to identify or process a response packet may remove the response packet from the SIP connection 304 or RTP connection used to provide the response packet. If no device properly identifies and removes the response packet, response packet may reach the communication device 104 associated with the first network 102(1). The response packet may be perceived by the user of the communication device 104 as a dropped packet (e.g., as silence).

At 316, the metric data 118 from the response packet may be stored in association with the communication type 226 corresponding to the communication conducted using the SIP connection 304. For example, at least a portion of the metric data 118 requested using the interrogatory data 116 may be determined from the response data 122. The response data 122 may also include destination network element data 214 indicative of one or more destination network elements 112 associated with the metric data 118. The communication type 226 corresponding to the communication may be determined from one or more devices associated with the first network 102(1) or the second network 102(2). The metric data 118, the destination network element data 214, or both may be stored, in association with the corresponding communication type 226, as communication data 126. The communication data 126 may be used to determine a quality metric 128 associated with one or more networks 102 when initiating a subsequent connection. For example, if the metric data 118 indicates a large quantity of latency, jitter, or packet loss associated with the second network 102(2), a subsequent attempt to initiate a communication may include establishing a SIP connection 304 or a RTP connection with a different network 102 that has a smaller quantity of associated latency, jitter, or packet loss. As another example, if the metric data 118 indicates a large quantity of latency, jitter, or packet loss associated with the second network 102(2), a notification may be generated and provided to one or more users associated with the second network 102(2) to facilitate correction of the deficiency. For example, if the metric data 118 indicates significant latency associated with a particular device, that device may be repaired, replaced, deactivated, and so forth. Continuing the example, communications may be routed using alternate devices due to the latency associated with the particular device.

Figure 4:
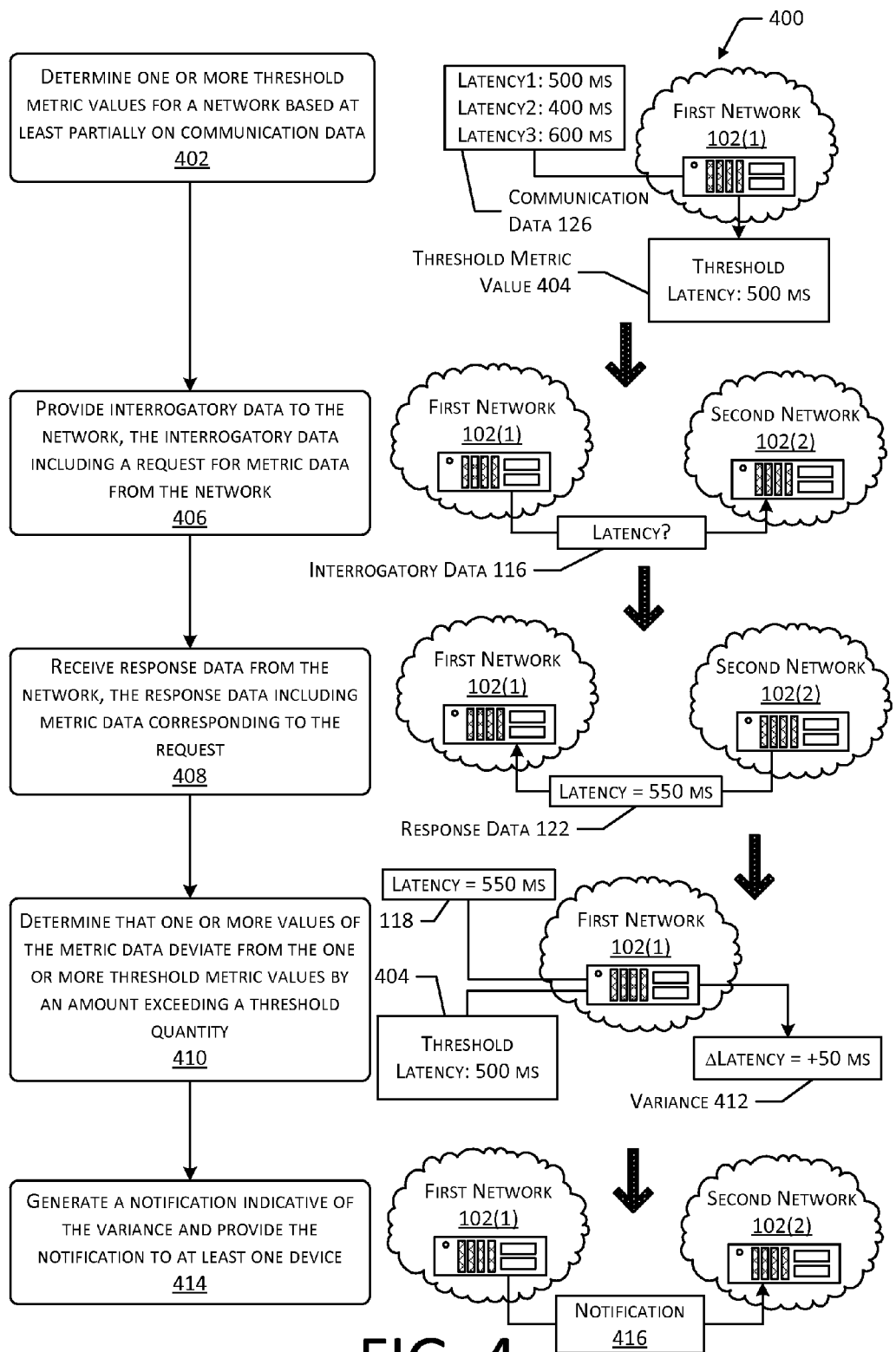
FIG. 4 illustrates a method for determining correspondence between received metric data and stored communication data as well as generating notifications indicative of variances.

FIG. 4 illustrates a method 400 for determining correspondence between received metric data 118 and stored communication data 126 as well as generating notifications indicative of variances. At 402, one or more threshold metric values 404 associated with a network 102 may be determined based at least partially on communication data 126. For example, communication data 126 indicative of previous communications with a second network 102(2) may be accessed by a device associated with a first network 102(1). The communication data 126 may include metric data 118 previously received with regard to the second network 102(2). For example, the communication data 126 may include information regarding the latency of one or more devices associated with the second network 102(2) at previous time periods, based on a communication type 226 associated with previous communications. Communication data 126 may include CDRs, metric data 118 received responsive to interrogatory data 116, and so forth.

For example, the communication data 126 may include multiple values corresponding to latency of one or more devices in the second network 102(2). From the communication data 126, a corresponding threshold metric value 404 may be determined. Continuing the example, a threshold metric value 404 for latency may include an average (e.g., mean, mode, or median) of multiple latency values of the communication data 126. In other implementations, a threshold metric value 404 may include a fixed value corresponding to a preselected quality of a communication, such as a latency of 500 ms. For example, a threshold metric value 404 may include a maximum amount of acceptable latency agreed upon in a SLA. In still other implementations, a threshold metric value 404 may change dynamically depending on the status of one or more devices in the second network 102(2), a time of day, and so forth.

At 406, interrogatory data 116 may be provided from the first network 102(1) to the second network 102(2). The interrogatory data 116 may include a request for metric data 118 associated with the second network 102(2). For example, the interrogatory data 116 may indicate one or more devices associated with the second network 102(2) and one or more types of metric data 118, such as latency data 218.

At 408, response data 122 from the second network 102(2) may be received by the first network 102(1). The response data 122 may include at least a portion of the metric data 118 corresponding to the metric request 208 provided in the interrogatory data 116. For example, responsive to a request for metric data 118 indicative of the latency of one or more destination network elements 112, the response data 122 may include latency data 218 indicative of the latency of one or more devices associated with the second network 102(2).

At 410, a device associated with the first network 102(1) may determine that one or more values of the received metric data 118 deviate from the threshold metric value(s) 404 determined from the communication data 126 by an amount equal to or exceeding a threshold quantity. For example, the threshold metric value(s) 404 may include a latency of 500 ms. The response data 122 may indicate a latency of 550 ms. The variance 412 between the metric data 118 and the threshold metric value(s) 404 may be determined by a notification module 132 associated with the first network 102(1), as described previously. FIG. 4 depicts the variance 412 as 50 ms. The variance 412 may be compared to a threshold quantity to determine the significance of the variance 412. The threshold quantity may include a fixed quantity, such as 50 ms. In other implementations, the threshold quantity may include a relative quantity, such as 10% of the threshold metric value 404.

At 414, responsive to the determination that the variance 412 equals or exceeds a threshold quantity, a notification 416 indicative of the variance 412 may be generated by the notification module 132. The notification 416 may be provided to one or more devices. The devices may be associated with one or more of the first network 102(1), the second network 102(2), or one or more other networks 102. For example, a particular destination network element 112 associated with the second network 102(2) may have a large quantity of latency associated therewith due to a current status of the destination network element 112 or the associated geographic region. The notification 416 may identify one or more devices associated with the variance 412. Providing the notification 416 to the second network 102(2) may enable one or more individuals associated with the second network 102(2) to correct the variance 412 by repairing or replacing deficient devices, routing communications using alternate devices, and so forth. The notification 416 may also be provided to one or more devices associated with the first network 102(1) or to devices associated with other networks 102. The notification 416 may provide users of other networks 102 with information regarding the variance 412 to enable connections to be established with networks 102 other than the second network 102(2).

Figure 5:
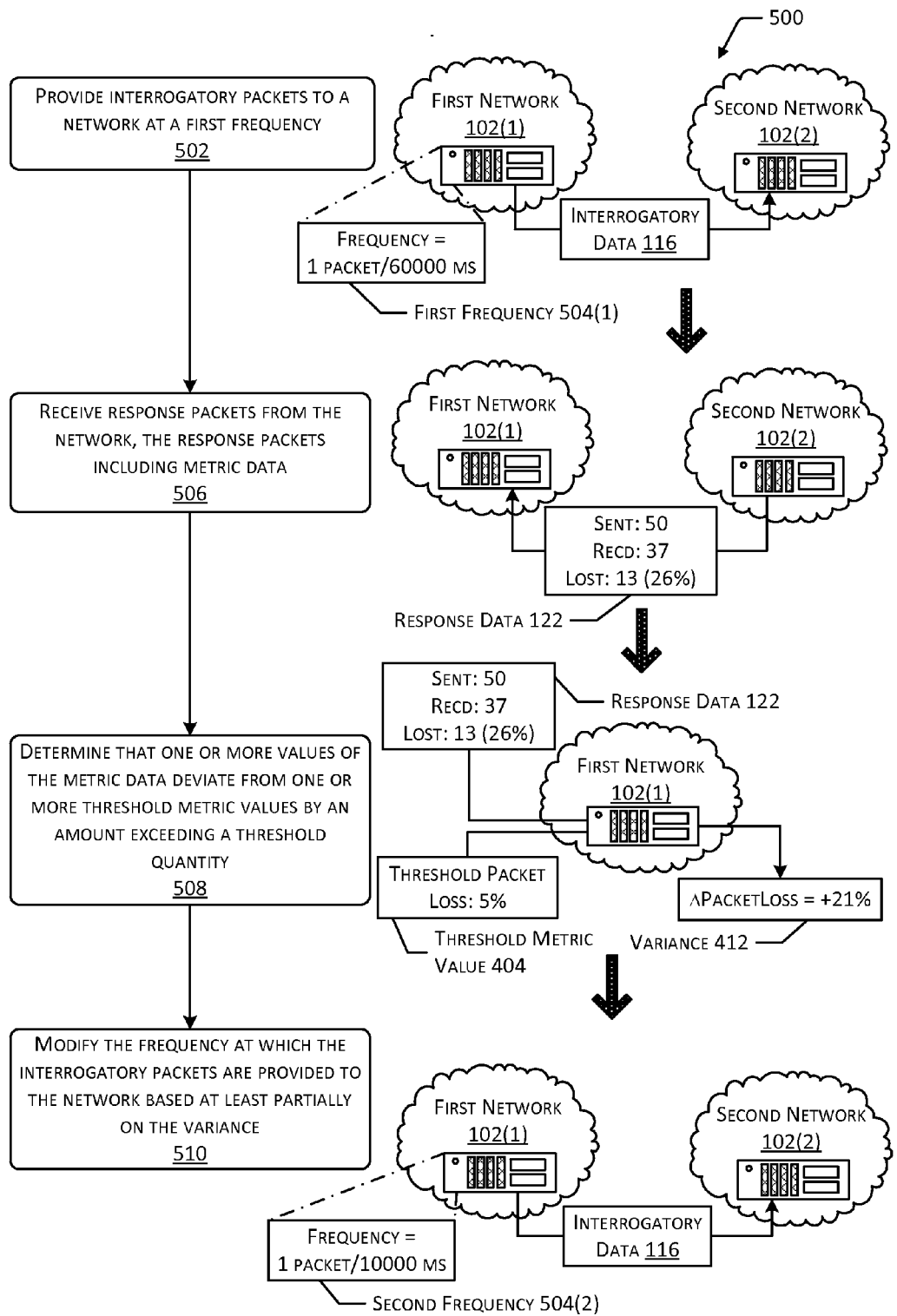
FIG. 5 illustrates a method for determining a frequency at which interrogatory data is provided from a first network to a second network based on metric data received from the second network.

FIG. 5 illustrates a method 500 for determining frequencies at which interrogatory data 116 is provided to a network 102 based on metric data 118 received from that network 102. At 502, interrogatory packets may initially be provided to a network 102 at a first frequency 504(1), from another network 102. For example, a first network 102(1) may provide interrogatory data 116 in the form of interrogatory packets to a second network 102(2), requesting metric data 118 from the second network 102(2). Interrogatory packets may initially be provided to the second network 102(2) at a first frequency 504(1), such as one packet per 60,000 ms. The first frequency 504(1) may be selected based on the bandwidth and processing resources available to one or more of the first network 102(1) or the second network 102(2). In other implementations, the first frequency 504(1) may be selected based on a quantity of information from the second network 102(2) that is suitable for determining quality metrics 128 or potential deficiencies affecting one or more devices. For example, providing a single interrogatory packet to the second network 102(2) per hour may be insufficient to identify potential deficiencies within the second network 102(2). Providing one interrogatory packet to the second network 102(2) every five seconds may unduly consume bandwidth and processing resources in the absence of a specific need for an increased quantity of metric data 118.

At 506, one or more response packets, including metric data 118, may be received from the network 102 initially provided the interrogatory packet. For example, response data 122, received by the first network 102(1) as one or more packets from the second network 102(2), may include packet loss data 222 indicating a packet loss of 26% associated with one or more devices within the second network 102(2). As described previously, the received metric data 118 may be stored as communication data 126 in a data store, compared to threshold metric values 404 to generate alerts, and so forth.

At 508, one or more devices associated with the first network 102(1) may determine that one or more values of the metric data 118 deviate from one or more threshold metric values 404 by an amount exceeding a threshold quantity. For example, a threshold metric value 404 corresponding to packet loss may be 5%. The response data 122 received from the second network 102(2) may include packet loss data 222 that indicates packet loss of 26%. The one or more devices associated with the first network 102(1) may determine that the packet loss indicated in the packet loss data 222 exceeds the threshold metric value 404 corresponding to packet loss by 21%. The variance 412 may be compared to a threshold quantity to determine the significance of the variance 412. The threshold quantity may include a fixed quantity, such as 2% greater or less than the threshold packet loss value, or a relative quantity, such as 10% of the threshold packet loss value.

At 510, the first frequency 504(1) at which the interrogatory packets are provided to the network 102 may be modified, based at least partially on the variance 412. For example, responsive to a variance 412 indicating the packet loss exceeds the threshold metric value 404 by 21%, the first network 102(1) may begin providing interrogatory packets to the second network 102(2) at a second frequency 504(2) greater than the first frequency 504(1). Continuing the example, the second frequency 504(2) may be one packet per 10,000 ms. In other implementations, if the variance 412 indicates a lower packet loss than the corresponding threshold metric value 404, the frequency 504 at which interrogatory packets are provided to the second network 102(2) may be decreased or may remain constant. In some implementations, the amount by which the frequency 504 is modified may be determined by the magnitude of the variance 412. For example, a variance 412 indicating a packet loss that is significantly greater than the corresponding threshold metric value 404 may result in a large increase in the frequency 504 at which interrogatory packets are delivered. In other implementations, the frequency 504 may be modified by a fixed rate, or the frequency 504 may be selected from multiple fixed values. For example, possible frequencies 504 may include a high frequency 504 (e.g., 1 packet per 10,000 ms), a medium frequency 504 (e.g., 1 packet per 60,000 ms), and a low frequency 504 (e.g., 1 packet per 120,000 ms).

Figure 6:
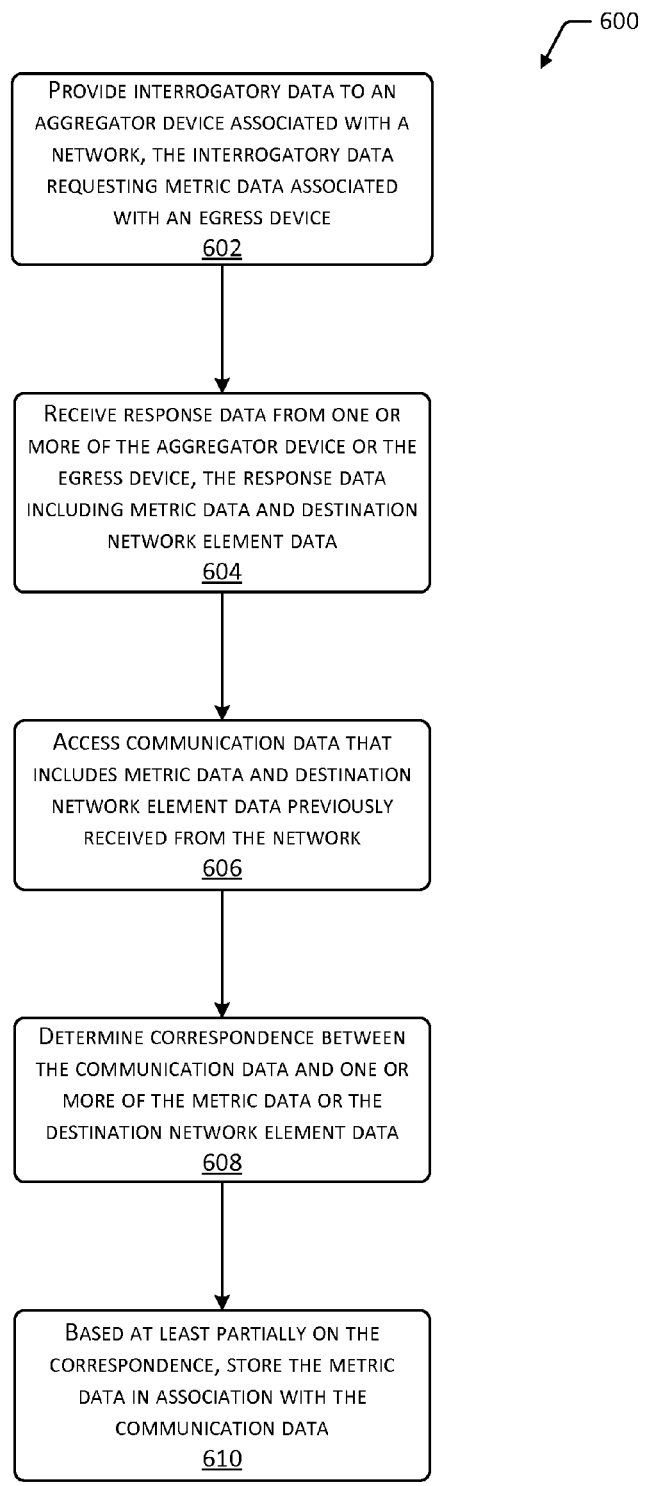
FIG. 6 is a flow diagram illustrating a method for determining validity of received response data using destination network element data and storing received metric data.

FIG. 6 is a flow diagram 600 illustrating a method for determining validity of received response data 122 using destination network element data 214. Block 602 provides interrogatory data 116 to an aggregator device associated with a network 102. The interrogatory data 116 may request metric data 118 associated with an egress device. For example, a user of a communication device 104 associated with a first network 102(1) may intend to initiate a VoIP or VoLTE communication with another communication device 104 via a SIP connection 304 or a RTP connection. Continuing the example, to initiate a SIP connection 304, the communication device 104 may provide a SIP invitation to an aggregator device. An aggregator device may include one or more servers, communication devices 104, network elements, SBCs 108, or other types of computing devices configured to communicate with multiple networks 102. For example, an aggregator device may be in communication with multiple cellular, telephonic, or computing networks 102. When a SIP connection 304 or RTP connection is initiated using an aggregator device, the aggregator device may then route the connection using one of the networks 102 with which the aggregator device communicates. Each network 102 may include a SBC 108 and one or more destination network elements 112. An egress device may be associated with the endpoint of the connection. An egress device may include a SBC 108 or another type of computing device. In some implementations, the egress device may be directly associated with the communication device 104 that is the destination of the communication. In other implementations, the egress device may instead provide voice packets 110 and interrogatory data 116 to a local telephone network (e.g., via telephone cables).

Each device associated with a network 102 may introduce one or more of latency, jitter, or packet loss to a communication conducted using the SIP or RTP connection. The latency, jitter, and packet loss associated with devices other than the aggregator device may not be visible to the user initiating the communication. The interrogatory data 116 may be provided to the aggregator device in-line, using the SIP or RTP connection and in the same manner as the voice packets 110 associated with the communication. The interrogatory data 116 may request metric data 118 associated with one or more devices within one or more networks 102 that communicate with the aggregator device. For example, the interrogatory data 116 may request metric data 118 associated with the egress device or one or more destination network elements 112 of a network 102. Responsive to the interrogatory data 116, one or more devices associated with the second network 102(2) or with the aggregator device may generate response data 122 to be provided to the first network 102(1).

Block 604 receives response data 122 from one or more of the aggregator device or the egress device, the response data 122 including metric data 118 and destination network element data 214. For example, responsive to the interrogatory data 116, at least a portion of the requested metric data 118 may be determined, such as by querying one or more destination network elements 112 or other devices associated with the second network 102(2). At least one device associated with the second network 102(2) may determine the metric data 118 and generate the response data 122. The response data 122 may be provided to the first network 102(1) in-line, using the existing SIP or RTP connection. In addition to the metric data 118, the response data 122 may include destination network element data 214 indicative of one or more destination network elements 112 within the network 102. For example, one or more of a name, a type, a location, or an identifier associated with one or more destination network elements 112 may be included in the response data 122. The destination network element data 214 may be used to verify the authenticity of the response data 122.

Block 606 accesses communication data 126 that may include metric data 118 and destination network element data 214 previously-received from the second network 102 (2). For example, during previous communications that were routed through one or more devices within the second network 102(2), interrogatory data 116 provided to an aggregator device or one or more other devices associated with the second network 102(2) may result in generation of response data 122. The previously-received response data 122 may include metric data 118 and destination network element data 214 associated with the second network 102(2). The previously-received metric data 118 and destination network element data 214 may be stored (e.g., in a data store) in association with a communication type 226 associated with the communication.

Block 608 determines correspondence between the communication data 126 and one or more of the metric data 118 or the destination network element data 214. For example, the destination network element data 214 received with the response data 122 may be indicative of one or more destination network elements 112 through which the communication was presumably routed. If correspondence between the previously-received destination network element data 214 of the communication data 126 and the destination network element data 214 received with the response data 122 is determined, this determination may indicate that the response data 122 is accurate. If a lack of correspondence between the previously-received destination network element data 214 of the communication data 126 and the destination network element data 214 received with the response data 122 is determined, this may indicate that the response data 122 is inaccurate, erroneous, or fraudulent. In other implementations, correspondence between the metric data 118 received with the response data 122 and the previously-received metric data 118 of the of the communication data 126 may be determined. For example, if the metric data 118 received with the response data 122 differs substantially from the previously-received metric data 118, this determination may indicate that the response data 122 is inaccurate, erroneous, or fraudulent.

Block 610 stores the received metric data 118 in association with the communication data 126, based at least partially on the correspondence between the communication data 126 and one or more of the metric data 118 or the destination network element data 214. For example, if the destination network element data 214 received with the response data 122 corresponds to the previously-received destination network element data 214 of the communication data 126, the received metric data 118 may be determined to be accurate. The received metric data 118 may then be stored in association with the corresponding communication type 226 and destination network element data 214 as additional communication data 126, which may be used to validate subsequent response data 122.

Figure 7:
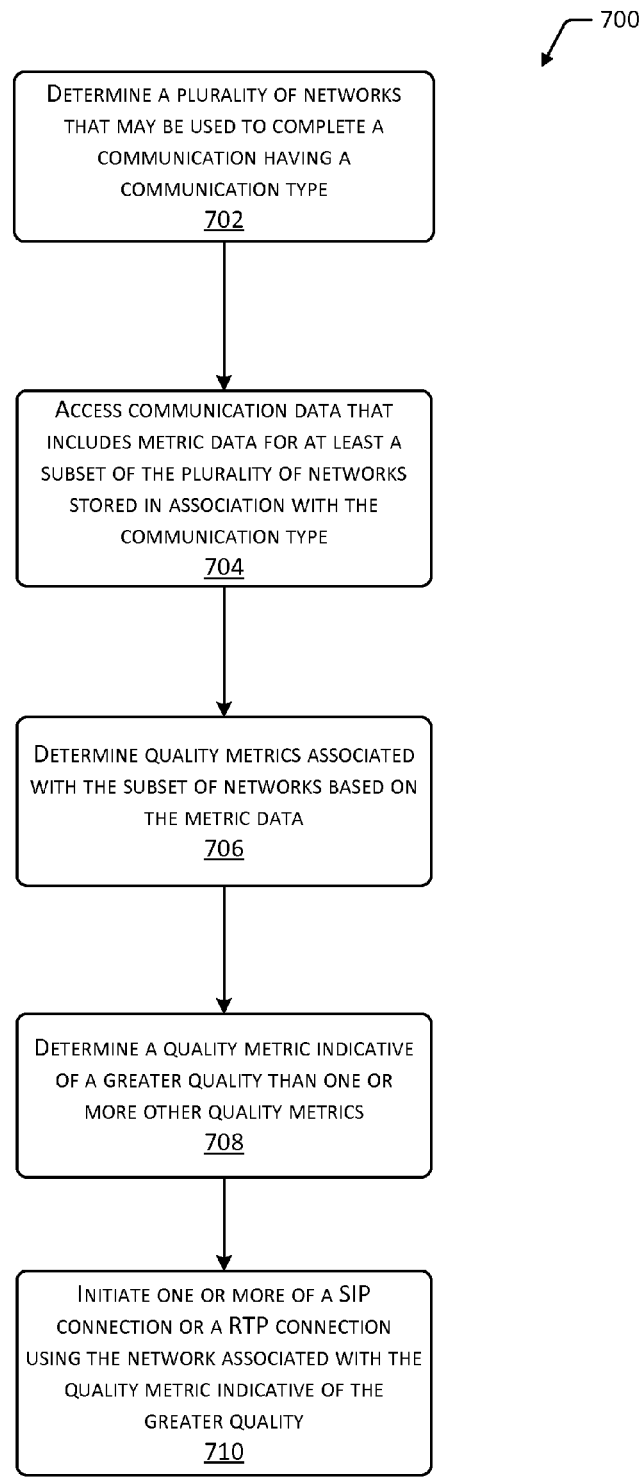
FIG. 7 is a flow diagram illustrating a method for determining a network for initiating a session initiation protocol (SIP) connection based on the quality metric associated with that network.

FIG. 7 is a flow diagram 700 illustrating a method for determining a network 102 for initiating one or more of a SIP connection 304 or a RTP connection based on the quality metric 128 associated with that network 102. Block 702 determines a plurality of networks 102 that may be used to complete a communication having a communication type 226. For example, a communication device 104 may be configured to communicate with multiple networks 102. A user of the communication device 104 may intend to initiate a VoIP call to communicate with another communication device 104. At least a subset of the networks 102 may be capable of facilitating a VoIP call. In some implementations, the subset of networks 102 may be determined by accessing communication data 126. For example, communication data 126 may include communication types 226 stored in association with other information indicative of a network 102.

Block 704 accesses communication data 126 that includes metric data 118 for at least a portion of the subset of networks 102, stored in association with the communication type 226 of the intended communication. The communication data 126 may be accessed both to determine networks 102 capable of facilitating the intended communication and to determine metric data 118 associated with one or more of the capable networks 102.

Block 706 determines quality metrics 128 associated with the subset of networks 102, based on the metric data 118. The quality metric 128 may include a qualitative or quantities measurement that may be based on one or more of latency data 218, jitter data 220, packet loss data 222, or other metric data 224. For example, the quality metric 128 may include average values for one or more types of metric data 118. In some implementations, one or more items of metric data 118 may be weighted based on the corresponding destination network element data 214 or the corresponding communication type 226. In other implementations, one or more of the latency data 218, jitter data 220, packet loss data 222, or other metric data 224 may, itself, constitute the quality metric 218. In still other implementations, the quality metric 218 may not be expressed in a manner that may be perceived by a user but may be compared to other quality metrics 218 by a computing device. For example, a quality metric 218 may be a numerical value representative of one or more of the latency data 218, jitter data 220, packet loss data 222, or other metric data 224 associated with a network 102. In another implementation, the quality metric 218 may include one or multiple subjective descriptors, such as "high latency" or "low packet loss." In some implementations, quality metrics 218 associated with a network 102 may be stored as communication data 126 and dynamically modified when additional metric data 118 relevant to a network 102 is received and stored.

Block 708 determines a quality metric 128 indicative of a greater quality than one or more other quality metrics 128. For example, one or more of a metric processing module 130 or communication module 120 may determine one or more quality metrics 128 indicative of a quality that exceeds the quality indicated by one or more other quality metrics 128. Continuing the example, a first quality metric 128, expressed numerically, may be greater than a second quality metric 128. As another example, a numerical quality metric 128 indicative of low latency, may be less than a quality metric 128 indicative of high latency. Determination of the quality indicated by a quality metric 128 may enable the quality of a communication via a network 102, relative to the performance of other networks 102, to be predicted. For example, a network 102 having low associated latency, jitter, and packet loss may have a quality metric 128 indicative of high quality. One or more of a SIP connection 304 or a RTP connection may subsequently be initiated with a network 102 that may provide the greatest quality to the communication. Block 710 initiates one or more of a SIP connection 304 or a RTP connection using the network 102 associated with the quality metric 128 indicative of the greater quality.

Figure 8:
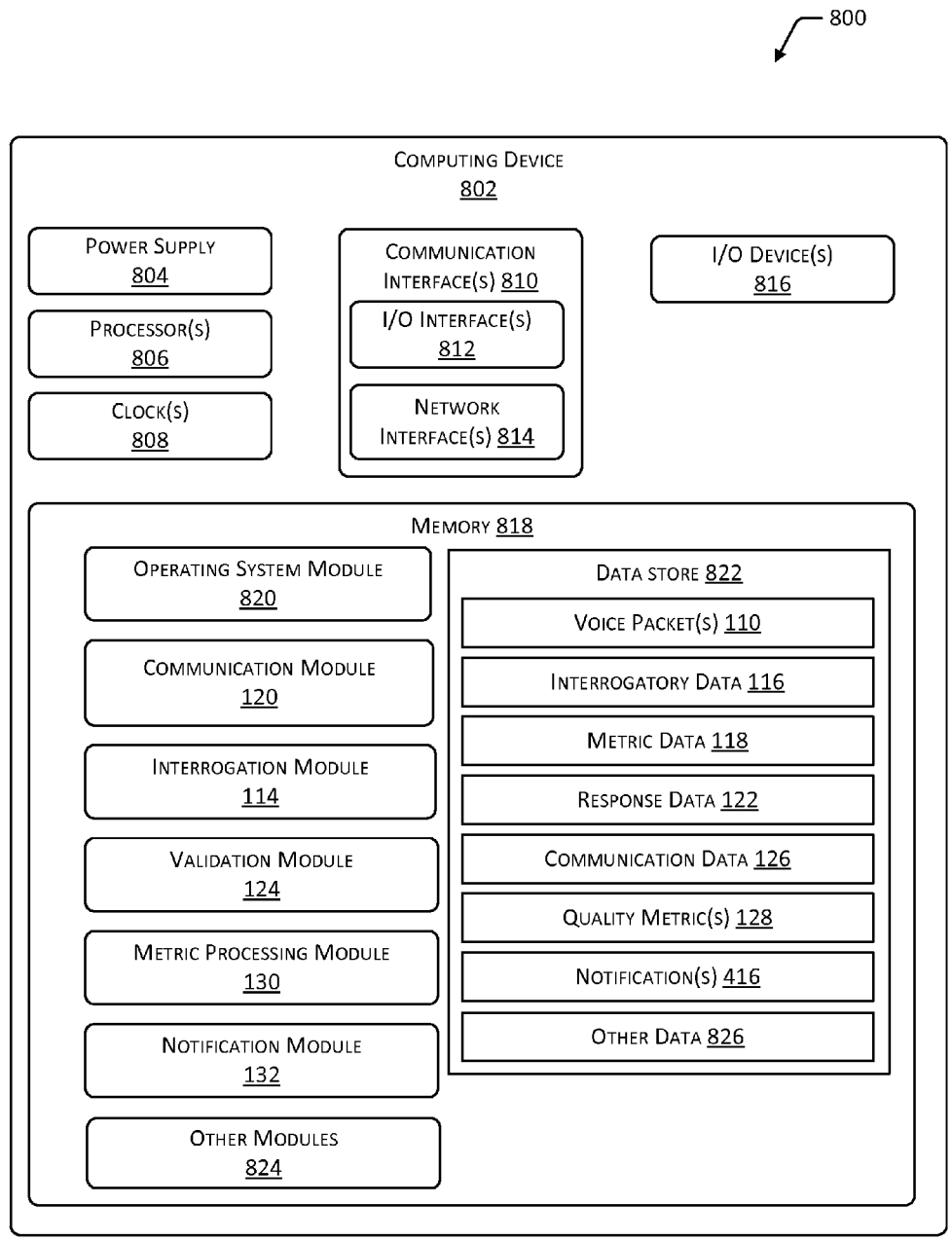
FIG. 8 is a block diagram illustrating a computing device within the scope of the present disclosure.

FIG. 8 is a block diagram 800 of a computing device 802 configured to support operation of the system 100. The computing device 802 may include one or more communication devices 104, one or more source network elements 106, one or more SBCs 108, one or more destination network elements 112, one or more servers, or one or more other computing devices 802 in communication with one or more of the communication devices 104, source network elements 106, SBCs 108, or destination network elements 112.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input device or output device associated with a communication device 104, source network element 106, SBC 108, destination network element 112, or other computing device 802. For example, I/O devices 816 may include input devices, such as touch sensors, keyboards, mouse devices, microphones, and so forth. I/O devices 816 may also include output devices, such as speakers, displays, and so forth. In some implementations, the I/O devices 816 may be physically incorporated with the computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks 102 including LANs, wireless LANs, WANs, wireless WANs, and so forth. For example, the network interfaces 814 may include devices compatible with Ethernet, Wi-Fi®, Bluetooth®, ZigBee®, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD® operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 822 and one or more of the following modules may also be stored in the memory 818. The modules may be executed as foreground applications, background tasks, daemons, and so forth. The data store 822 may use a flat file, database, linked list, tree, executable code, script, or other data structure to store information. In some implementations, the data store 822 or a portion of the data store 822 may be distributed across one or more other devices including other computing devices 802, network attached storage devices, and so forth.

The communication module 120 may be configured to establish communications with one or more other computing devices 802, such communication devices 104, source network elements 106, SBCs 108, destination network elements 112, or other computing devices 802 in communication therewith. The communications may be authenticated, encrypted, and so forth. In some implementations, the communication module 120 may establish SIP connections 304, RTP connections, or other types of connections, such as a User Datagram Protocol (UDP) or Transmission Control Protocol (TCP) connection, with other computing devices 802 associated with other networks. The communication module 120 may include audio and data processing components for converting audio data received from one or more of the I/O devices 816 to voice packets 110. Video data received from I/O devices 816 may similarly be converted to data packets to be provided to other computing devices 802. The voice packets 110 or video data packets, as well as the interrogatory data 116, may be provided to other computing devices 802 associated with other networks 102 via the SIP or RTP connection. The communication module 120 may be configured to access communication data 126 associated with one or more networks 102 to determine quality metrics 128 for the networks 102. Based on the quality metrics 128, the communication module 120 may determine one or more networks 102 with which to establish one or more of a SIP connection 304 or a RTP connection. The quality metrics 128 may be used to predict the quality of a communication associated with one network 102 relative to other networks 102.

The memory 818 may also include the interrogation module 114. The interrogation module 114 may be used to generate interrogatory data 116, which may be provided to one or more computing devices 802 associated with an existing SIP or RTP connection. The interrogatory data 116 may be provided with signed credentials 202, one or more source identifiers 204 indicative of the network 102 or computing device(s) 802 from which the interrogatory data 116 originated, source network element data 206 indicative of source network elements 106 within the network 102, and a metric request 208 indicative of one or more types of metric data 118 or one or more types of devices.

The memory 818 may further include the validation module 124. When response data 122 from another network 102 is received, the response data 122 may include one or more of signed credentials 202, one or more destination identifiers 212, destination network element data 214, metric data 118, or other response data 216. The validation module 124 may access communication data 126 to determine one or more known signed credentials 202, destination identifiers 212, or destination network element data 214 associated with the network 102. If correspondence between the communication data 126 and the response data 122 is determined, this determination may indicate that the response data 122 is accurate, valid, or non-fraudulent. If a lack of correspondence between the communication data 126 and the response data 122 is determined, this determination may indicate that the response data 122 is erroneous or fraudulent. In some implementations, the validation module 124 may determine validity of the response data 122 by determining correspondence or a lack of correspondence between previously-received metric data 118 within the communication data 126 and metric data 118 received as response data 122. A computing device 802 may be configured to refrain from processing response data 122 if the validation module 124 determines a lack of correspondence between the communication data 126 and the response data 122.

The memory 818 may store the metric processing module 130. The metric processing module 130 may receive response data 122 and determine the metric data 118 from the response data 122. For example, the metric processing module 130 may determine one or more of latency data 218, jitter data 220, packet loss data 222, or other metric data 224. The metric processing module 130 may determine a source associated with the response data 122 based at least partially on the signed credentials 202, the destination identifiers 212, or the destination network element data 214. The metric processing module 130 may also determine a communication type 226 associated with the connection from which the response data 122 is received. The metric processing module 130 may store received metric data 118 in association with destination network element data 214 and a communication type 226, as additional communication data 126.

The memory 818 may also store the notification module 132. The notification module 132 may determine threshold metric data from the communication data 126. For example, a threshold metric value 404 may be based at least partially on previously-received metric data 118. In some implementations, a threshold metric value 404 may include a fixed value. The notification module 132 may determine a variance 412 between received metric data 118 associated with one or more networks 102 and stored threshold metric values 404. Responsive to the variance 412, the notification module 132 may generate one or more notifications 416 indicative of the variance 412 and provide the notifications 416 to one or more devices associated with one or more networks 102. A notification 416 may include a message, an alert, an alarm, and so forth.

Other modules 824 may also be present in the memory 818. For example, encryption modules may be used to encrypt and decrypt communications between computing devices 802. Network determination modules may determine available networks 102 by which communications may be initiated. User interface modules may provide metric data 118 or indications of potential failures or inefficiencies in one or more devices to users.

Other data 826 in the data store 822 may include user input data regarding weighting of certain types of metric data 118, threshold metric values 404, threshold values by which a received metric value may deviate before a notification 416 is provided, user-selected frequencies 504 at which interrogatory data 116 is provided, and so forth.

In different implementations, different computing devices 802 may have different capabilities or capacities. For example, a server may have significantly more processor 806 capability and memory 818 capacity compared to the processor 806 capability and memory 818 capacity of a communication device 104, such as a smartphone.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more source network elements;
one or more memories storing computer-executable instructions; and
one or more hardware processors configured to execute the computer-executable instructions to:
access a connection comprising one or more of a session initiation protocol (SIP) connection or a real-time transport protocol (RTP) connection established between at least one of the one or more source network elements and an aggregator device, wherein the aggregator device is in communication with at least one egress device associated with an endpoint of the connection;
determine packet characteristics of one or more voice packets transmitted using the one or more of the SIP connection or the RTP connection, the packet characteristics including data indicative of one or more of a packet length, a data structure, or an identifier;
provide an interrogatory packet to the aggregator device, wherein the interrogatory packet is provided in-line using the connection, and wherein the interrogatory packet comprises:
the one or more of the packet length, the data structure, or the identifier that correspond to the packet characteristics, wherein the one or more of the packet length, the data structure, or the identifier is configured to cause at least one device to transit the interrogatory packet based on the packet characteristics;
a first signature indicative of the at least one of the one or more source network elements providing the interrogatory packet to the aggregator device; and
a request for metric data associated with one or more of: the aggregator device, the at least one egress device, or one or more other devices in communication with the aggregator device or the at least one egress device;
wherein the metric data comprises one or more of: latency data, jitter data, or packet loss data; and
receive a response packet from the aggregator device, wherein the response packet comprises:
a second signature indicative of the aggregator device;
destination network element data indicative of the at least one egress device; and
the metric data associated with the one or more of: the aggregator device, the at least one egress device, or the one or more other devices.

2. The system of claim 1, wherein the metric data corresponds to a communication type, the system further comprising computer-executable instructions to:
access communication data indicative of one or more communications between the one or more source network elements and the aggregator device;
wherein the communication data comprises one or more of:
latency data associated with the communication type;
jitter data associated with the communication type; or
packet loss data associated with the communication type;
determine correspondence between the communication type associated with the metric data and the communication type associated with the communication data;

determine a first quality metric associated with the aggregator device and the communication type;

access one or more second quality metrics associated with at least one second aggregator device; and establish one or more of a voice session or a video session with the aggregator device or the at least one second aggregator device based at least in part on the first quality metric and the one or more second quality metrics.

3. The system of claim 1, wherein the response packet further comprises:

the one or more of the packet length, the data structure, or the identifier that correspond to the packet characteristics, wherein the one or more of the packet length, the data structure, or the identifier is configured to cause the at least one device to transit the response packet based on the packet characteristics.

4. The system of claim 1, wherein the destination network element data is indicative of at least one intermediate device in communication with the aggregator device and associated with the connection, and wherein the at least one intermediate device is configured to receive the interrogatory packet and provide the interrogatory packet to the at least one egress device.

5. A method comprising:

accessing a connection for transmitting one or more of audio data or video data, the one or more of the audio data or the video data having one or more packet characteristics that include one or more of a packet length, a data structure, or an identifier;

providing interrogatory data to a first device, wherein the interrogatory data comprises the one or more packet characteristics, at least one first identifier, and a request for metric data, and the one or more packet characteristics are configured to cause the first device to transmit the interrogatory data to a second device;

receiving response data from the first device, wherein the response data comprises at least one second identifier and metric data associated with one or more of the first device, the second device, or at least one third device;

determining a communication type associated with the interrogatory data and the response data;

storing the metric data in association with the communication type; and determining a quality metric associated with one or more of the communication type, the first device, the second device, or the at least one third device.

6. The method of claim 5, wherein:

the connection includes one or more of a SIP connection or a RTP connection, providing the interrogatory data to the first device comprises providing at least one interrogatory packet comprising the interrogatory data to the first device in-line using the one or more of the SIP connection or the RTP connection, and wherein the interrogatory data is configured for removal from a data stream transmitting the one or more of the audio data or the video data upon processing by one or more of the second device or the at least one third device.

7. The method of claim 5, wherein the response data includes the one or more packet characteristics and the one or more packet characteristics are configured to cause the first device to transmit the response data.

8. The method of claim 5, further comprising:

determining a variance between the metric data and communication data associated with one or more of the first device, the at least one second device, or one or more third devices; and generating a notification indicative of the variance.

9. The method of claim 5, further comprising:

determining at least one second quality metric for at least a subset of the plurality of devices;

determining correspondence between the quality metric and the at least one second quality metric; and initiating one or more of a SIP connection or a RTP connection with the first device or the at least one second device based at least partially on the correspondence between the quality metric and the at least one second quality metric.

10. The method of claim 5, wherein the at least one second identifier comprises destination network element data, the method further comprising:

determining correspondence between the destination network element data and communication data comprising known network element data associated with a plurality of devices comprising the first device and the at least one second device; and generating a notification based at least partially on the correspondence.

11. The method of claim 5, wherein the providing the interrogatory data to the first device comprises providing a plurality of interrogatory packets to the first device at a frequency, the method further comprising:

determining a variance between the metric data and communication data associated with one or more of the first device, the at least one second device, or one or more third devices; and modifying the frequency at which the interrogatory packets are provided to the first device based at least partially on the variance.

12. The method of claim 5, further comprising:

receiving a notification indicative of a variance between the metric data and communication data associated with the one or more of the first device or the at least one second device;

wherein the providing of the interrogatory data to the first device is based at least partially on the notification.

13. A system comprising:

at least one source network element;

one or more memories storing computer-executable instructions; and one or more hardware processors configured to execute the computer-executable instructions to:

access a connection between the at least one source network element and a first destination network element, wherein the first destination network element is in communication with a second destination network element and at least one intermediate destination network element, and the connection transmits one or more of audio data or video data, the one or more of the audio data or the video data having one or more packet characteristics that include one or more of a packet length, a data structure, or an identifier;

provide interrogatory data to the first destination network element via the connection, wherein the interrogatory data comprises the one or more packet characteristics and a request for metric data associated with one or more of the second destination network element or the at least one intermediate destination network element, wherein the one or more packet characteristics cause one or more of:
the first destination network element to transit the interrogatory data to the at least one intermediate destination network element; or
the at least one intermediate destination network element to transit the interrogatory data to the second destination network element; and
receive response data from one or more of the first destination network element, the second destination network element, or the at least one intermediate destination network element, wherein the response data comprises at least one identifier associated with the one or more of the first destination network element, the second destination network element, or the at least one intermediate destination network element and the metric data associated with the one or more of the second destination network element or the at least one intermediate destination network element.

14. The system of claim 13, wherein the metric data comprises one or more of latency data, jitter data, or packet loss data associated with the one or more of the second destination network element or the at least one intermediate destination network element.

15. The system of claim 13, wherein the second destination network element comprises an endpoint device associated with an endpoint of the connection, and wherein the at least one intermediate destination network element comprises one or more devices in communication with the endpoint device and the first destination network element, and the response data further includes:
at least one response packet having the one or more packet characteristics to configure the at least one interrogatory packet for transmission by one or more of the first destination network element or the at least one intermediate destination network element.

16. The system of claim 13, further comprising computer-executable instructions to:
determine correspondence between the metric data and communication data associated with one or more communications;
wherein the communication data comprises metrics stored in association with one or more of:
the first destination network element;
the second destination network element;
the at least one intermediate destination network element; or
one or more communication types associated with the one or more communications; and
establish a second connection based at least partially on the correspondence between the metric data and the communication data.

17. The system of claim 13, wherein the interrogatory data comprises one or more interrogatory packets, and wherein at least one of the one or more interrogatory packets comprises a field identifying the one or more interrogatory packets to configure the one or more interrogatory packets for processing by the one or more of the second destination network element or the at least one intermediate destination network element.

18. The system of claim 13, further comprising computer-executable instructions to:
determine correspondence between the at least one identifier of the response data and communication data comprising known network element data associated with one or more of the first destination network element, the second destination network element, or the at least one intermediate network element.

19. The system of claim 13, further comprising computer-executable instructions to:
determine a variance between the metric data and one or more threshold metric values, wherein the variance is greater than or equal to a threshold variance; and
based at least partially on the variance, provide a notification to one or more of the at least one source network element, the first destination network element, the second destination network element, or the at least one intermediate destination network element.

20. The system of claim 13, wherein the computer-executable instructions to provide the interrogatory data further comprise computer-executable instructions to provide interrogatory packets to the first destination network element at a frequency, the system further comprising computer-executable instructions to:
determine a variance between the metric data and one or more threshold metric values; and
modify the frequency of providing interrogatory packets to the first destination network element based at least partially on the variance.

* * * * *